(12) United States Patent
York et al.

(10) Patent No.: US 10,495,807 B2
(45) Date of Patent: Dec. 3, 2019

(54) LIGHT GUIDE ILLUMINATION DEVICE FOR DIRECT-INDIRECT ILLUMINATION

(71) Applicant: Quarkstar LLC, Las Vegas, NV (US)

(72) Inventors: Allan Brent York, Fort Langley (CA); Ferdinand Schinagl, North Vancvouer (CA); Wilson Dau, Victoria (CA); Louis Lerman, Las Vegas, NV (US); Hans Peter Stormberg, Stolberg (DE)

(73) Assignee: Quarkstar LLC, Las Vegas, NV (US)

( * ) Notice: Subject to any disclaimer, the term of this patent is extended or adjusted under 35 U.S.C. 154(b) by 0 days.

(21) Appl. No.: 15/894,713

(22) Filed: Feb. 12, 2018

(65) Prior Publication Data

US 2019/0018182 A1 Jan. 17, 2019

Related U.S. Application Data

(63) Continuation of application No. 15/415,722, filed on Jan. 25, 2017, now Pat. No. 9,891,371, which is a
(Continued)

(51) Int. Cl.
*F21V 7/00* (2006.01)
*F21V 8/00* (2006.01)
(Continued)

(52) U.S. Cl.
CPC .............. *G02B 6/0055* (2013.01); *F21K 9/61* (2016.08); *F21S 8/026* (2013.01); *F21V 7/0016* (2013.01);
(Continued)

(58) Field of Classification Search
CPC ........ F21S 8/04; F21V 7/0016; F21V 7/0025; F21V 7/0033; F21Y 2103/10;
(Continued)

(56) References Cited

U.S. PATENT DOCUMENTS 2,194,841 A 3/1940 Welch
2,626,120 A 1/1953 Baker
(Continued)

FOREIGN PATENT DOCUMENTS

CA 2702690 A1 11/2010
CN 2200747 Y 6/1995
(Continued)

OTHER PUBLICATIONS

European Application No. 17188348.1, European Search Report dated Dec. 8, 2017, 6 pages.
(Continued)

*Primary Examiner* — William J Carter
(74) *Attorney, Agent, or Firm* — Fish & Richardson P.C.

(57) ABSTRACT

An illumination device includes light-emitting elements (LEEs); a light guide extending in a forward direction from a first end to a second end, the light guide being positioned to receive at the first end light emitted by the LEEs and to guide the received light to the second end; and an optical extractor coupled to the second end to receive the guided light. The optical extractor is formed from a transparent, solid material and includes a first output surface including a transmissive portion arranged and shaped to transmit a first portion of the guided light to the ambient in a forward angular range and a reflective portion arranged and shaped to reflect via TIR all the guided light incident on the reflective portion; and a second output surface arranged to transmit, to the ambient in a backward angular range, light reflected by the reflective portion of the first output surface.

20 Claims, 9 Drawing Sheets

Related U.S. Application Data continuation of application No. 14/422,872, filed as application No. PCT/US2014/056141 on Sep. 17, 2014, now Pat. No. 9,557,030.

(60) Provisional application No. 61/878,764, filed on Sep. 17, 2013.

(51) Int. Cl.
| | |
|---|---|
| *F21K 9/61* | (2016.01) |
| *G02B 19/00* | (2006.01) |
| *F21S 8/02* | (2006.01) |
| *F21Y 101/00* | (2016.01) |
| *F21Y 103/10* | (2016.01) |
| *F21Y 115/10* | (2016.01) |

(52) U.S. Cl.
CPC ............ *F21V 7/0091* (2013.01); *G02B 6/005* (2013.01); *G02B 6/0023* (2013.01); *G02B 6/0031* (2013.01); *G02B 6/0035* (2013.01); *G02B 6/0045* (2013.01); *G02B 6/0046* (2013.01); *G02B 6/0085* (2013.01); *G02B 6/0096* (2013.01); *G02B 19/00* (2013.01); *F21Y 2101/00* (2013.01); *F21Y 2103/10* (2016.08); *F21Y 2115/10* (2016.08)

(58) Field of Classification Search
CPC . F21Y 2115/10; G02B 6/0011; G02B 6/0001; G02B 6/0031; G02B 6/0045; G02B 6/0096
USPC .................................................. 362/600–634
See application file for complete search history.

(56) References Cited

U.S. PATENT DOCUMENTS

| | | |
|---|---|---|
| 3,772,506 A | 11/1973 | Junginger |
| 3,836,767 A | 9/1974 | Lasker |
| 4,112,483 A | 9/1978 | Small |
| 4,240,692 A | 12/1980 | Winston |
| 4,254,456 A | 3/1981 | Grindle |
| 4,271,408 A | 6/1981 | Teshima |
| 4,358,817 A | 11/1982 | Bielemeier |
| 5,075,827 A | 12/1991 | Smith |
| 5,134,550 A | 7/1992 | Young |
| 5,289,356 A | 2/1994 | Winston |
| 5,436,805 A | 7/1995 | Hsu |
| 5,438,485 A | 8/1995 | Li |
| 5,448,460 A | 9/1995 | Belfer et al. |
| 5,581,683 A | 12/1996 | Bertignoll et al. |
| 5,810,463 A | 9/1998 | Kawahara |
| 5,868,489 A | 2/1999 | Fuller |
| 5,988,836 A | 11/1999 | Swarens |
| 6,058,271 A | 5/2000 | Tenmyo |
| 6,186,642 B1 | 2/2001 | Corcorran et al. |
| 6,234,643 B1 | 5/2001 | Lichon |
| 6,241,369 B1 | 6/2001 | Mackiewicz |
| 6,250,019 B1 | 6/2001 | Simons |
| 6,273,577 B1 | 8/2001 | Goto |
| 6,350,041 B1 | 2/2002 | Tarsa |
| 6,441,943 B1 | 8/2002 | Roberts |
| 6,505,953 B1 | 1/2003 | Dahlen |
| 6,527,420 B1 | 3/2003 | Chuang |
| 6,540,373 B2 | 4/2003 | Bailey |
| 6,543,911 B1 | 4/2003 | Rizkin |
| 6,572,246 B1 | 6/2003 | Hopp |
| 6,598,998 B2 | 7/2003 | West |
| 6,834,979 B1 | 12/2004 | Cleaver |
| 6,880,963 B2 | 4/2005 | Luig |
| 6,932,499 B2 | 8/2005 | Ogura |
| 6,948,828 B1 | 9/2005 | Chambers et al. |
| 6,948,840 B2 | 9/2005 | Grenda et al. |
| 7,083,315 B2 | 8/2006 | Hansler |
| 7,097,337 B2 | 8/2006 | Kim |
| 7,134,768 B2 | 11/2006 | Suzuki |
| 7,156,540 B2 | 1/2007 | Haines |
| 7,164,842 B2 | 1/2007 | Chen |
| 7,182,480 B2 | 2/2007 | Kan |
| 7,259,403 B2 | 8/2007 | Shimizu |
| 7,275,841 B2 | 10/2007 | Kelly |
| 7,286,296 B2 | 10/2007 | Chaves |
| 7,290,906 B2 | 11/2007 | Suzuki |
| 7,293,889 B2 | 11/2007 | Kamiya |
| 7,331,691 B2 | 2/2008 | Livesay |
| 7,334,932 B2 | 2/2008 | Klettke |
| 7,341,358 B2 | 3/2008 | Hsieh |
| 7,375,382 B2 | 5/2008 | Tessnow |
| 7,386,214 B1 | 6/2008 | Cianciotto |
| 7,387,399 B2 | 6/2008 | Noh |
| 7,434,951 B2 | 10/2008 | Bienick |
| 7,530,712 B2 | 5/2009 | Lin |
| 7,645,054 B2 | 1/2010 | Goihl |
| 7,837,370 B2 | 11/2010 | Bierhuizen |
| 7,850,347 B2 | 12/2010 | Speier |
| 7,855,815 B2 | 12/2010 | Hayashide |
| 7,942,546 B2 | 5/2011 | Naijo |
| 7,942,565 B2 | 5/2011 | Klick |
| 7,947,915 B2 | 5/2011 | Lee |
| 7,967,477 B2 | 6/2011 | Bloemen |
| 8,002,446 B1 | 8/2011 | Plunk |
| 8,006,453 B2 | 8/2011 | Anderson |
| 8,042,968 B2 | 10/2011 | Boyer |
| 8,061,867 B2 | 11/2011 | Kim |
| 8,068,707 B1 | 11/2011 | Simon |
| 8,075,147 B2 | 12/2011 | Chaves |
| 8,192,051 B2 | 6/2012 | Dau |
| 8,227,106 B2 | 10/2012 | Van Gorkom |
| 8,348,489 B2 | 1/2013 | Holman |
| 8,506,112 B1 | 8/2013 | Dau |
| 8,556,452 B2 | 10/2013 | Simon |
| 8,573,823 B2 | 11/2013 | Dau |
| 8,602,586 B1 | 12/2013 | Dau |
| 8,696,184 B2 | 4/2014 | Morino |
| 8,740,407 B2 | 6/2014 | Kotovsky |
| 8,833,969 B2 | 9/2014 | Speier |
| 8,833,996 B2 | 9/2014 | Dau |
| 8,899,808 B2 | 12/2014 | Speier |
| 8,960,980 B2 | 2/2015 | Tsai |
| 9,028,120 B2 | 5/2015 | Dau |
| 9,519,095 B2 | 12/2016 | Wilcox |
| 9,625,636 B2 | 4/2017 | Durkee |
| 2003/0117798 A1 | 6/2003 | Leysath |
| 2004/0012976 A1 | 1/2004 | Amano |
| 2004/0080947 A1 | 4/2004 | Subisak |
| 2004/0105264 A1 | 6/2004 | Spero |
| 2004/0120160 A1 | 6/2004 | Natsume |
| 2004/0137189 A1 | 7/2004 | Tellini |
| 2004/0208019 A1 | 10/2004 | Koizumi |
| 2004/0228131 A1 | 11/2004 | Minano |
| 2004/0257803 A1 | 12/2004 | Kermoade |
| 2005/0057922 A1 | 3/2005 | Herst |
| 2005/0063169 A1 | 3/2005 | Erber |
| 2005/0111235 A1 | 5/2005 | Suzuki |
| 2005/0185416 A1 | 8/2005 | Lee |
| 2005/0201102 A1 | 9/2005 | Saccomanno |
| 2005/0207177 A1 | 9/2005 | Guy |
| 2005/0243570 A1 | 11/2005 | Chaves |
| 2005/0253526 A1 | 11/2005 | Shibahara et al. |
| 2005/0265044 A1 | 12/2005 | Chen |
| 2005/0270774 A1 | 12/2005 | Pan |
| 2005/0276566 A1 | 12/2005 | Iimura |
| 2006/0002131 A1 | 1/2006 | Schultz et al. |
| 2006/0002678 A1 | 1/2006 | Weber |
| 2006/0061990 A1 | 3/2006 | Chinniah |
| 2006/0076568 A1 | 4/2006 | Keller |
| 2006/0098444 A1 | 5/2006 | Petruzzi |
| 2006/0139917 A1 | 6/2006 | Ward |
| 2006/0164839 A1 | 7/2006 | Stefanov |
| 2006/0187661 A1 | 8/2006 | Holten |
| 2007/0047228 A1 | 3/2007 | Thompson |
| 2007/0061360 A1 | 3/2007 | Holcombe |
| 2007/0081360 A1 | 4/2007 | Bailey |

(56) References Cited

U.S. PATENT DOCUMENTS

| | | |
|---|---|---|
| 2007/0097696 A1 | 5/2007 | Eng |
| 2007/0201234 A1 | 8/2007 | Ottermann |
| 2007/0280593 A1 | 12/2007 | Brychell |
| 2008/0074752 A1 | 3/2008 | Chaves |
| 2008/0080166 A1 | 4/2008 | Duong |
| 2008/0123367 A1 | 5/2008 | Pan et al. |
| 2008/0170398 A1 | 7/2008 | Kim |
| 2008/0192458 A1 | 8/2008 | Li |
| 2008/0198603 A1 | 8/2008 | Sormani |
| 2008/0210154 A1 | 9/2008 | Nakano et al. |
| 2009/0027588 A1 | 1/2009 | Medendorp |
| 2009/0103293 A1 | 4/2009 | Harbers |
| 2009/0168395 A1 | 7/2009 | Mrakovich |
| 2009/0201698 A1* | 8/2009 | Klick .................. G02B 6/0018 362/555 |
| 2009/0231831 A1 | 9/2009 | Hsiao |
| 2009/0231878 A1 | 9/2009 | Van |
| 2009/0316414 A1 | 12/2009 | Yang |
| 2010/0085773 A1 | 4/2010 | Richardson |
| 2010/0208456 A1 | 8/2010 | Huang |
| 2010/0220497 A1 | 9/2010 | Ngai |
| 2010/0246158 A1 | 9/2010 | Van |
| 2010/0302799 A1 | 12/2010 | Rosberg et al. |
| 2010/0321952 A1 | 12/2010 | Coleman |
| 2011/0001901 A1 | 1/2011 | Solomon |
| 2011/0043132 A1 | 2/2011 | Kim |
| 2011/0063870 A1 | 3/2011 | Nomoto |
| 2011/0103067 A1 | 5/2011 | Ago |
| 2011/0164398 A1 | 7/2011 | Holten |
| 2011/0164421 A1 | 7/2011 | Velazquez |
| 2011/0175533 A1 | 7/2011 | Holman |
| 2011/0182084 A1 | 7/2011 | Tomlinson |
| 2011/0199005 A1 | 8/2011 | Bretschneider |
| 2011/0227487 A1 | 9/2011 | Nichol |
| 2011/0234121 A1 | 9/2011 | Ding |
| 2011/0235318 A1 | 9/2011 | Simon |
| 2011/0267836 A1 | 11/2011 | Boonekamp |
| 2011/0273900 A1 | 11/2011 | Li |
| 2011/0286200 A1 | 11/2011 | Iimura |
| 2012/0020066 A1 | 1/2012 | Chang |
| 2012/0026751 A1 | 2/2012 | Lin et al. |
| 2012/0044675 A1 | 2/2012 | Buelow |
| 2012/0069595 A1 | 3/2012 | Catalano |
| 2012/0069600 A1 | 3/2012 | Lin |
| 2012/0099086 A1 | 4/2012 | Kropac |
| 2012/0147621 A1 | 6/2012 | Holten |
| 2012/0147624 A1 | 6/2012 | Li |
| 2012/0155110 A1 | 6/2012 | Pijlman |
| 2012/0155116 A1 | 6/2012 | Gardner |
| 2012/0170260 A1 | 7/2012 | Gardner |
| 2012/0236586 A1 | 9/2012 | Wang |
| 2012/0250346 A1 | 10/2012 | Williams |
| 2012/0268966 A1 | 10/2012 | McCollum |
| 2012/0281432 A1 | 11/2012 | Parker |
| 2012/0287633 A1 | 11/2012 | Kelly et al. |
| 2012/0294037 A1 | 11/2012 | Holman |
| 2012/0328242 A1 | 12/2012 | Hesse |
| 2013/0039050 A1 | 2/2013 | Dau |
| 2013/0039090 A1 | 2/2013 | Dau |
| 2013/0083555 A1 | 4/2013 | Chen et al. |
| 2013/0201715 A1 | 8/2013 | Dau |
| 2013/0208495 A1 | 8/2013 | Dau |
| 2013/0258699 A1 | 10/2013 | Weaver |
| 2013/0272015 A1 | 10/2013 | Weaver |
| 2013/0308338 A1 | 11/2013 | Lin et al. |
| 2014/0104868 A1 | 4/2014 | Speier |
| 2014/0126235 A1 | 5/2014 | Speier |
| 2014/0160779 A1 | 6/2014 | Pusch et al. |
| 2014/0192558 A1 | 7/2014 | Dau |
| 2014/0226360 A1 | 8/2014 | Krijn |

FOREIGN PATENT DOCUMENTS

| | | |
|---|---|---|
| CN | 201203056 Y | 3/2009 |
| CN | 101501392 A1 | 8/2009 |
| CN | 102282416 A1 | 12/2011 |
| CN | 102576118 A1 | 7/2012 |
| DE | 19917401 A1 | 10/2000 |
| DE | 102011001769 A1 | 10/2012 |
| DE | 102012107437 A1 | 6/2014 |
| DE | 102013211868 A1 | 12/2014 |
| EP | 1182395 A1 | 2/2002 |
| EP | 1744096 A1 | 1/2007 |
| EP | 2161494 A1 | 3/2010 |
| EP | 2163701 A1 | 3/2010 |
| EP | 2196725 A1 | 6/2010 |
| EP | 2264359 A1 | 12/2010 |
| EP | 2327340 A1 | 6/2011 |
| EP | 2439564 A1 | 4/2012 |
| EP | 2778512 A1 | 9/2014 |
| EP | 2886937 A1 | 6/2015 |
| FR | 2784739 A1 | 4/2000 |
| FR | 2934353 A1 | 1/2010 |
| JP | 2014229510 A1 | 12/2014 |
| KR | 2011033699 A1 | 3/2011 |
| WO | WO2001007828 A1 | 2/2001 |
| WO | WO2003009012 A1 | 1/2003 |
| WO | WO2005073629 A1 | 8/2005 |
| WO | WO2005090854 A1 | 9/2005 |
| WO | WO2006064434 A1 | 6/2006 |
| WO | WO2007146373 A1 | 12/2007 |
| WO | WO2008007315 A1 | 1/2008 |
| WO | WO2008017968 A1 | 2/2008 |
| WO | WO2008047278 A1 | 4/2008 |
| WO | WO2008139383 A1 | 11/2008 |
| WO | WO2009099547 A1 | 8/2009 |
| WO | WO2009105168 A1 | 8/2009 |
| WO | WO2010042423 A1 | 4/2010 |
| WO | WO2010079391 A1 | 7/2010 |
| WO | WO2010103450 A1 | 9/2010 |
| WO | WO2010113091 A1 | 10/2010 |
| WO | WO2011112914 A1 | 9/2011 |
| WO | WO2012024607 A1 | 2/2012 |
| WO | WO2012059852 A1 | 5/2012 |
| WO | WO2012093126 A1 | 7/2012 |
| WO | WO2012105314 A1 | 8/2012 |
| WO | WO2012131560 A1 | 10/2012 |
| WO | WO2012176352 A1 | 12/2012 |
| WO | WO2013023008 A1 | 2/2013 |
| WO | WO2013066822 A1 | 5/2013 |
| WO | WO2013154835 A1 | 10/2013 |
| WO | WO2015113979 A1 | 8/2015 |

OTHER PUBLICATIONS

European Application No. 17188348.1, Communication pursuant to Article 94(3) dated Dec. 21, 2017, 7 pages.

Philips Lighting Company, "Philips EnduraLED Candle LED Lamps", Downloaded from the Internet at: www.lighting.philips.com/us_en/browseliterature/download/p-6027 on Jan. 27, 2012, 2 pages (2010).

http://www.everlight.com/datasheets/OL-Flat_Series_Data_Sheet_v5.pdf, "Datasheet: Office Lighting Flat Luminaire Series", product catalog, Everlight, Issue No. DBM-0000054_v5, May 5, 2011, pp. 1-5.

International Search Report and Written Opinion in International Application No. PCT/US2014/056141, dated Jan. 23, 2015, 8 pages.

International Application No. PCT/US2015/059513, Notification of Transmittal of the International Search Report and the Written Opinion of the International Searching Authority, dated Mar. 31, 2016, 21 pages.

European Patent Application No. 13837454, Communication pursuant to Rule 164(1) EPC, Partial Supplementary European Search Report, dated Jun. 1, 2016, 8 pages.

* cited by examiner

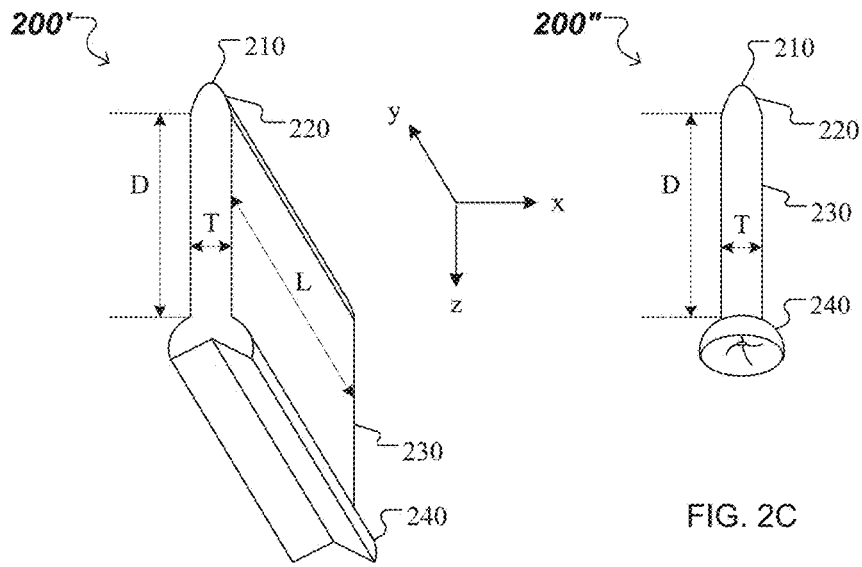
FIG. 2B
FIG. 2C
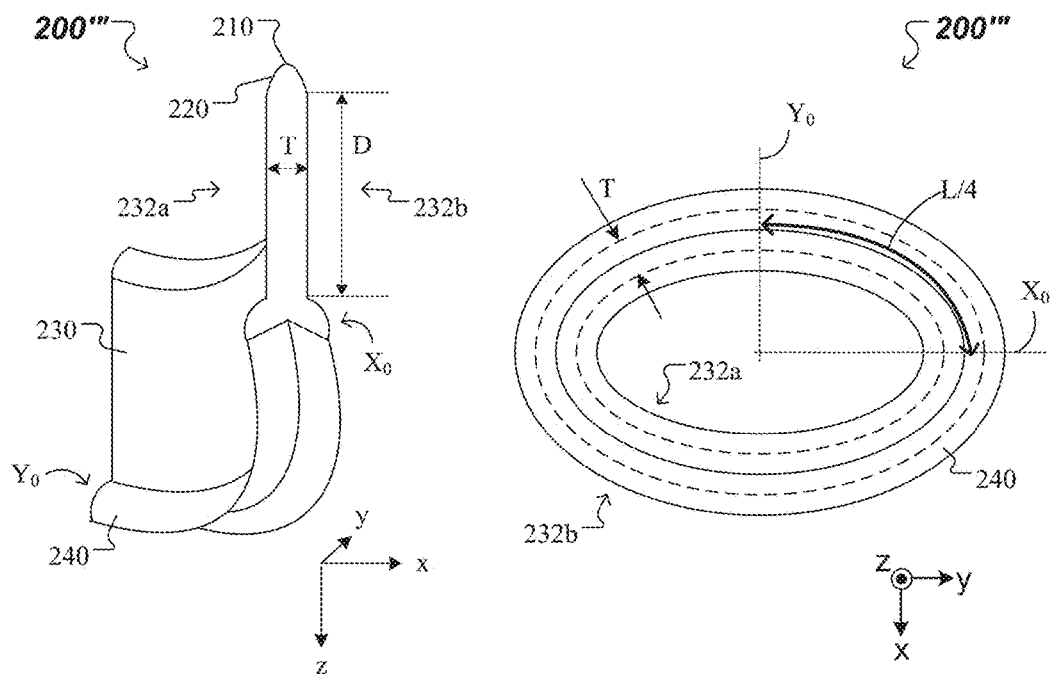
FIG. 2D
FIG. 2E

LIGHT GUIDE ILLUMINATION DEVICE FOR DIRECT-INDIRECT ILLUMINATION

CROSS-REFERENCE TO RELATED APPLICATIONS

This application is continuation of U.S. application Ser. No. 15/415,722, filed Jan. 25, 2017, which is a continuation of U.S. application Ser. No. 14/422,872, filed Feb. 20, 2015, which is a U.S. National Stage of International Application No. PCT/US2014/056141, filed Sep. 17, 2014, which claims benefit under 35 U.S.C. § 119(e)(1) of U.S. Provisional Application No. 61/878,764, filed on Sep. 17, 2013, the entire contents of which are incorporated by reference herein.

TECHNICAL FIELD

The present disclosure relates generally to solid state-based light guide illumination devices, for example to light guide illumination devices including an optical extractor with an output surface having portions shaped to reflect, via total internal reflection (TIR), guided light incident thereon.

BACKGROUND

Light sources are used in a variety of applications, such as providing general illumination and providing light for electronic displays (e.g., LCDs). Historically, incandescent light sources have been widely used for general illumination purposes. Incandescent light sources produce light by heating a filament wire to a high temperature until it glows. The hot filament is protected from oxidation in the air with a glass enclosure that is filled with inert gas or evacuated. Incandescent light sources are gradually being replaced in many applications by other types of electric lights, such as fluorescent lamps, compact fluorescent lamps (CFL), cold cathode fluorescent lamps (CCFL), high-intensity discharge lamps, and solid state light sources, such as light-emitting diodes (LEDs).

SUMMARY

The present disclosure relates to illumination devices that include an optical extractor with an output surface having portions shaped to reflect, via TIR, guided light incident thereon.

In general, innovative aspects of the technologies described herein can be implemented in an illumination device that includes one or more of the following aspects:

In one aspect, an illumination device includes a plurality of light-emitting elements (LEEs); a light guide extending in a forward direction from a first end of the light guide to a second end of the light guide, the light guide being positioned to receive at the first end light emitted by the LEEs and configured to guide the received light to the second end via total internal reflection (TIR); and an optical extractor optically coupled to the light guide at the second end to receive the guided light. Here, the optical extractor is formed from a transparent, solid material and includes a first output surface including a transmissive portion arranged and shaped to transmit a first portion of the guided light to the ambient environment in a forward angular range and a reflective portion arranged and shaped to reflect via TIR all the guided light incident on the reflective portion; and a second output surface having a curvilinear profile in a cross-section that includes the forward direction, the second output surface arranged to transmit, to the ambient environment in a backward angular range, light reflected by the reflective portion of the first output surface.

The foregoing and other embodiments can each optionally include one or more of the following features, alone or in combination.

In some implementations, the reflective portion of the first output surface has a first end and a second end and can be arranged to intersect the transmissive portion of the first output surface at the first end and the second output surface at the second end. In some cases, at least one of the transmissive portion or the reflective portion can be flat. In some cases, at least one of the transmissive portion or the reflective portion can be curved. In some cases, at least one of the transmissive portion or the reflective portion can include a step. In some cases, the transmissive portion can intersect the reflective portion at the first end with common surface slope.

In some implementations, the transmissive portion of the first output surface has a first end and a second end and can be arranged to intersect the reflective portion of the first output surface at the first end and the second output surface at the second end. In some cases, at least one of the transmissive portion or the reflective portion can be flat. In some cases, at least one of the transmissive portion or the reflective portion can be curved. In some cases, at least one of the transmissive portion or the reflective portion can include a step. In some cases, an intersection of the transmissive portion and the reflective portion at the first end can form a kink.

In some implementations, a relative arrangement of the first and second output surfaces causes light that propagates within the optical extractor to undergo multiple reflections between the first and second output surfaces such that light output into the ambient in the forward angular range and/or in the backward angular range can have a more uniform intensity distribution or a more uniform color distribution than the guided light at the second end of the light guide.

In some implementations, the reflective portion of the first output surface is arranged and shaped to reflect via TIR all the guided light incident thereon in a first angular range having a direction with a component antiparallel to the forward direction and a first component orthogonal to the forward direction. Here, the first output surface further includes a second transmissive portion arranged and shaped to transmit a second portion of the guided light to the ambient environment in another forward angular range and a second reflective portion arranged and shaped to reflect via TIR all the guided light incident on the second reflective portion; the optical extractor further includes a third output surface having a curvilinear profile in the cross-section that includes the forward direction, the third output surface arranged to transmit, to the ambient environment in another backward angular range, light reflected by the second reflective portion of the first output surface; and the second reflective portion of the first output surface is arranged and shaped to reflect via TIR all the guided light incident thereof in a second angular range having a direction with a component antiparallel to the forward direction and antiparallel to the first component of the first direction.

In some implementations, the light guide and the optical extractor can be bonded together or integrally formed. In some implementations, the disclosed illumination device can further include one or more optical couplers. Here, the light provided by the LEEs is in an emission angular range, the optical couplers are arranged to receive the light provided by the LEEs and redirect it to the first end of the light guide a collimated angular range, and a numerical aperture of the light guide is such that the light received from the optical couplers in the collimated angular range can be guided by the light guide through TIR.

In some implementations, the light guide can have two parallel side surfaces.

In some implementations, the disclosed illumination device can extend orthogonally to the forward direction. Here, the LEEs can be arranged orthogonally to the forward direction. In some implementations, the LEEs can be LEDs that emit white light.

The details of one or more implementations of the technologies described herein are set forth in the accompanying drawings and the description below. Other features, aspects, and advantages of the disclosed technologies will become apparent from the description, the drawings, and the claims.

BRIEF DESCRIPTION OF THE DRAWINGS

FIGS. 2A-2F show aspects of light guide luminaire modules.

Reference numbers and designations in the various drawings indicate exemplary aspects, implementations of particular features of the present disclosure.

DETAILED DESCRIPTION

The present disclosure relates to illumination devices for providing direct and/or indirect illumination. The disclosed illumination devices can efficiently guide and distribute light emitted by solid-state light sources towards work surfaces and/or towards background regions. Various luminous surfaces of the disclosed illumination devices and their respective intensity vectors can be manipulated within an illuminated environment to provide good utility of the light distribution output by the disclosed illumination devices. The present technology can harness the collective output of a plurality of solid-state light sources and create a virtual light source with unique properties that can result in compact luminaires with a small physical footprint relative to the illuminated environment.

Here, the light from the solid-state light sources is received at an input end of a light guide and guided to an output end thereof. The guided light is received by an optical extractor with an output surface having reflective portions shaped to reflect, via TIR, guided light incident thereon. In this manner, the reflected light is directed towards the background regions, while guided light incident on the output surface outside of the reflective portions is transmitted through the output surface and directed towards the work surfaces.

Figure 1A:
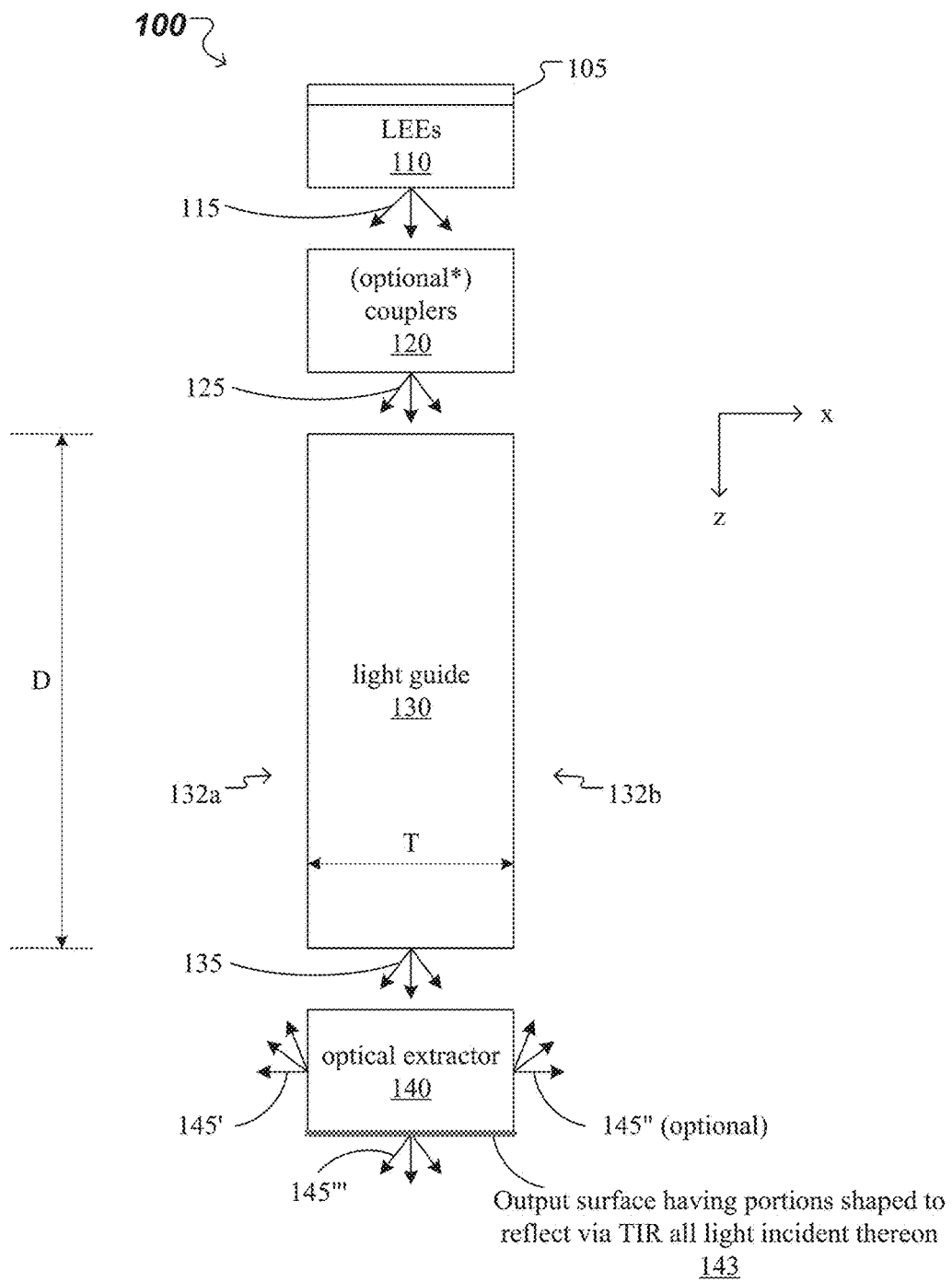
FIG. 1A shows a light guide illumination device that includes an optical extractor with an output surface having portions shaped to reflect, via TIR, guided light incident thereon.

(i) Light Guide Illumination Device that Includes an Optical Extractor with an Output Surface Having Portions Shaped to Reflect, Via TIR, Guided Light Incident Thereon FIG. 1A illustrates a block diagram of an illumination device 100 that includes an optical extractor 140 with an output surface 143 having one or more light reflecting portions shaped to reflect, via TIR, light incident thereon. Such light reflecting portions are referred to as TIR portions of the output surface 143. Additionally, the output surface 143 also has one or more light transmitting portions. The latter are referred to as transmissive portions. The illumination device 100 further includes a substrate 105, one or more light emitting elements (LEEs) 110 and a light guide 130. As such, the illumination device 100 is also referred to as a light guide illumination device 100. The light guide 130 guides the light provided by the LEEs 110 along a length D (e.g., along the z-axis of the Cartesian reference system shown in FIG. 1A.) Optionally, the light guide illumination device 100 further includes one or more optical couplers 120, such that the light guide 130 is coupled at its input end to the optical coupler(s) 120 and at its output end to the optical extractor 140.

In general, a LEE, also referred to as a light emitter, is a device that emits radiation in one or more regions of the electromagnetic spectrum from among the visible region, the infrared region and/or the ultraviolet region, when activated. Activation of a LEE can be achieved by applying a potential difference across components of the LEE or passing a current through components of the LEE, for example. A LEE can have monochromatic, quasi-monochromatic, polychromatic or broadband spectral emission characteristics. Examples of LEEs include semiconductor, organic, polymer/polymeric light-emitting diodes, other monochromatic, quasi-monochromatic or other light-emitting elements. In some implementations, a LEE is a specific device that emits the radiation, for example a LED die. In other implementations, the LEE includes a combination of the specific device that emits the radiation (e.g., a LED die) together with a housing or package within which the specific device or devices are placed. Examples of LEEs include also lasers and more specifically semiconductor lasers, such as vertical cavity surface emitting lasers (VCSELs) and edge emitting lasers. Further examples of LEEs include superluminescent diodes and other superluminescent devices.

During operation, the LEEs 110 provide light within a first angular range 115. Such light can have a Lambertian distribution relative to the optical axes of the one or more LEEs 110 (e.g., the z-axis.) As used herein, providing light in an "angular range" refers to providing light that propagates in one or more prevalent directions in which each has a divergence with respect to the corresponding prevalent direction. In this context, the term "prevalent direction of propagation" refers to a direction along which a portion of an intensity distribution of the propagating light has a maximum. For example, the prevalent direction of propagation associated with the angular range can be an orientation of a lobe of the intensity distribution. (See, e.g., FIG. 1B.) Also in this context, the term "divergence" refers to a solid angle outside of which the intensity distribution of the propagating light drops below a predefined fraction of a maximum of the intensity distribution. For example, the divergence associated with the angular range can be the width of the lobe of the intensity distribution. The predefined fraction can be 10%, 5%, 1%, or other values, depending on the lighting application.

The light guide 130 can be made from a solid, transparent material. For example, the material can be glass with a refractive index of about 1.5. As another example, the material can be plastic with a refractive index of about 1.5-1.6. Here, the light guide 130 is arranged to receive the light provided by the LEEs 110 at one end of the light guide 130 and to guide the received light in a forward direction, e.g., along the z-axis, from the receiving end to an opposing end of the light guide 130. Here, the distance D between the receiving end of the light guide 130 and its opposing end can be 5, 10, 20, 50 or 100 cm, for instance. A combination of (i) an angular range in which the light is received by the light guide 130 at the receiving end and (ii) a numerical aperture of the light guide 130 is configured such that the received light is guided from the receiving end to the opposing end through reflection off of light guide side surfaces 132a, 132b of the light guide 130. Depending on the implementation, at least some, if not all, of this reflection is via total internal reflection (TIR). In some implementations, the numerical aperture of the light guide 130 is such that all light provided by the LEEs 110 in the angular range 115 can be injected directly into the light guide 130 at its receiving end.

In the implementations when the one or more optical couplers 120 are part of the light guide illumination device 100, the one or more optical couplers 120 receive the light from the LEEs 110 within the first angular range 115 and collimate the received light within a second angular range 125 in the forward direction. The one or more optical couplers 120 are shaped to transform the first angular range 115 into the second angular range 125 via total internal reflection, specular reflection or both. Moreover, the one or more optical couplers 120 can include a solid transparent material for propagating light from an input end to an output end of each of the one or more optical couplers 120. Here, the divergence of the second angular range 125 is smaller than the divergence of the first angular range 115. As such, the divergence of the second angular range 125 is selected such that all light provided by the coupler(s) 120 in the angular range 125 can be injected into the light guide 130 at its receiving end.

One or more of the light guide side surfaces 132a, 132b can be planar, curved or otherwise shaped. The light guide side surfaces 132a, 132b can be parallel or non-parallel. In embodiments with non-parallel light guide side surfaces 132a, 132b, a third angular range 135 of the guided light at the opposing end of the light guide 130 is different than the angular range 115 (when the light guide 130 receives the light directly from the LEEs 110) or 125 (when the light guide 130 receives the light from the couplers 120) of the light received at the receiving end. Here, the light guide side surfaces 132a, 132b can be optically smooth to allow for the guided light to propagate forward (e.g., in the positive direction of the z-axis) inside the light guide 130 through TIR. In this case, the light guide side surfaces 132a, 132b are shaped and arranged with respect to the z-axis and each other such that the guided light impinges on the light guide side surfaces 132a, 132b at incident angles larger than a critical angle over the entire distance D from the input end the output end of the light guide 130. In embodiments with parallel light guide side surfaces 132a, 132b, whether the light guide 130 is solid or hollow, the third angular range 135 of the guided light at the opposing end of the light guide 130 has at least substantially the same divergence as the angular range 115 (when the light guide 130 receives the light directly from the LEEs 110) or 125 (when the light guide 130 receives the light directly from the couplers 120) of the light received at the receiving end.

Additionally, the length D of the light guide 130 (along the z-axis), a width L of the light guide 130 (along the y-axis) and a thickness T of the light guide 130 (along the x-axis) are designed to homogenize the light emitted by the discrete LEEs 110—which are distributed along the y-axis— as it is guided from the receiving end to the opposing end of the light guide 130. In this manner, the homogenizing of the emitted light—as it is guided through the light guide 130— causes a change of a discrete profile along the y-axis of the first angular range 115 (when the light guide 130 receives the light directly from the LEEs 110) or the second angular range 125 (when the light guide 130 receives the light from the couplers 120) to a continuous profile along the y-axis of the third angular range 135 in which the discrete profile is partially or fully blurred.

Here, the optical extractor 140 is made from a solid, transparent material. For example, the material can be glass with a refractive index of about 1.5. As another example, the material can be plastic with a refractive index of about 1.5-1.6. The optical extractor 140 has an input aperture that is coupled to the output end of the light guide 130 to receive the guided light. Moreover, the optical extractor 140 includes an output surface 143 and one or more lateral output surfaces.

The output surface 143 is spaced apart from and opposite to the input aperture. Further, the output surface 143 has one or more TIR portions and one or more transmissive portions. Here, a TIR portion is a region of the output surface 143 that is arranged relative to the input aperture and shaped to reflect, via TIR, all guided light received from the light guide 130. In this manner, a shape and/or orientation of the TIR portion are such that the guided light impinges thereon at an angle of incidence larger than a critical angle associated with an optical interface between the optical extractor 140 and the ambient environment (e.g., air). As such, all the guided light impinging on the TIR portion(s) is reflected, via TIR, back into the optical extractor 140. A transmissive portion is another region of the output surface 143 that is arranged relative to the input aperture and shaped to transmit the guided light. In this manner, a shape and/or orientation of the transmissive portion are such that the guided light impinges thereon at an angle of incidence smaller than a critical angle associated with an optical interface between the optical extractor 140 and the ambient environment (e.g., air). As such, substantially all light impinging on the transmissive portion(s) is transmitted there through into the ambient environment as forward output light, except for a small fraction of the impinging light, e.g., 4% or less, that is reflected via Fresnel reflection.

The light reflected, via TIR, by the TIR portions of the output surface 143 is directed towards the one or more lateral output surfaces of the optical extractor 140. Light that reaches the lateral output surface(s) is then transmitted at least in part into the ambient environment as backward output light. Furthermore, the optical extractor 140 can output into the ambient environment output light in one or more backward angular ranges. As such, the light transmitted through a first lateral output surface is output by the extractor 140 within a first output angular range 145'. The backward output angular range 145' can be substantially continuous along the y-axis and has a first output propagation direction with a component along a backward direction (or opposite to the forward direction, e.g., antiparallel to the z-axis.) Additionally, the light transmitted through the transmissive portions of the output surface 143 is output by the optical extractor 140 within a forward output angular range 145'''. The forward output angular range 145''' can be substantially continuous along the y-axis and has a second output propagation direction with a component along the forward direction (e.g., along the z-axis.) In some implementations, some of the light reflected via TIR by the TIR portions of the output surface 143 is transmitted through a second lateral output surface within a second backward output angular range 145''. The second backward output angular range 145" can be substantially continuous along the y-axis and has a second output propagation direction with a component along the backward direction. In this case, the first output propagation direction and the second output propagation direction have respective components orthogonal to the forward direction that are opposite (antiparallel) to each other (antiparallel and parallel to the x-axis.)

Note that a relative arrangement of the output surface 143 and the lateral output surface(s) may causes light that propagates within the optical extractor 140 to undergo multiple reflections between the output surface 143 and the lateral output surface(s) such that light output into the ambient environment in the forward output angular range 145'" and/or in the backward angular range(s) 145' (and/or 145") has a more uniform intensity distribution or a more uniform color distribution than the guided light at the second end of the light guide 130.

As described above in connection with FIG. 1A, the one or more optical couplers 120, light guide 130 and the optical extractor 140 of illumination device 100 are arranged and configured to translate and redirect light emitted by LEEs 110 away from the LEEs before the light is output into the ambient environment. The spatial separation of the place of generation of the light, also referred to as the physical (light) source, from the place of extraction of the light, also referred to as a virtual light source or a virtual filament, can facilitate design of the illumination device 100. In this manner, a virtual filament can be configured to provide substantially non-isotropic light emission with respect to planes parallel to an optical axis of the illumination device (for example the z-axis.) In contrast, a typical incandescent filament generally emits substantially isotropically distributed amounts of light. The virtual filament(s) may be viewed as one or more portions of space from which substantial amounts of light appear to emanate. Furthermore, separating the LEEs 110, with their predetermined optical, thermal, electrical and mechanical constraints, from the place of light extraction, may facilitate a greater degree of design freedom of the illumination device 100 and allows for an extended optical path, which can permit a predetermined level of light mixing before light is output from the illumination device 100.

Figure 1B:
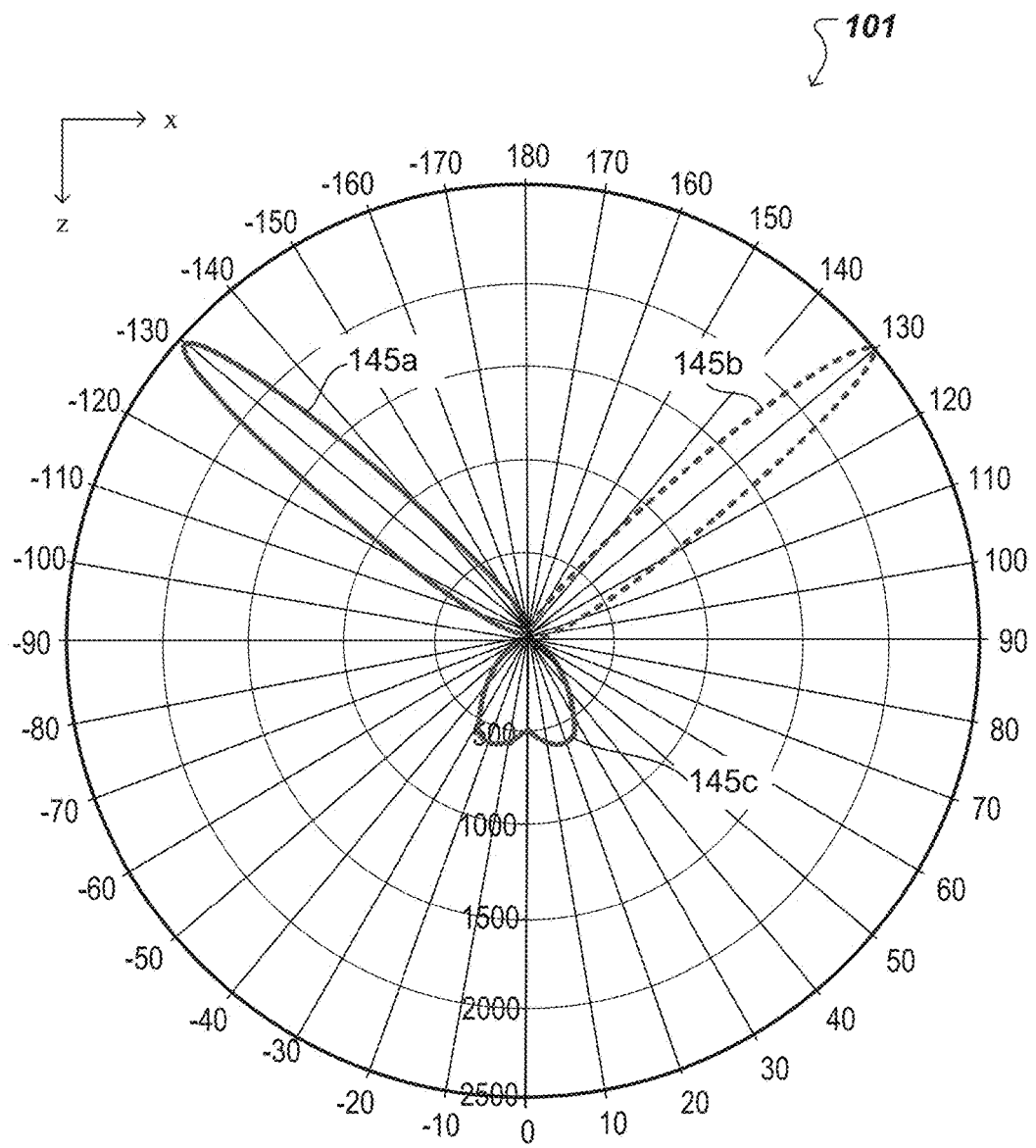
FIG. 1B is an intensity profile of the luminaire module shown in FIG. 1A.

FIG. 1B shows an x-z cross-section of far-field light intensity profile 101 of the illumination device 100 that is elongated along the y-axis (perpendicular to the sectional plane of FIG. 1A). In some implementations, the far-field light intensity profile 101 includes a first output lobe 145a representing light output by the illumination device 100 in the first backward output angular range 145' and a second output lobe 145c representing modified light output by the illumination device 100 in the forward output angular range 145'".

For example, the first output lobe 145a is a representation of the intensity, divergence and propagation direction of light output by the optical extractor 140 in the first backward output angular range 145' when this output light reaches a target located far from the optical extractor 140. Here, the light output in the backward output angular range 145' originates as a portion of the guided light in the angular range 135 that impinges on at least some of the one or more TIR portions of the output surface 143 where it is reflected, via TIR, towards a first lateral output surface, and where it is transmitted there through to the ambient environment. In this case, a propagation direction of the first backward output angular range 145' is along the about −130° bisector of the first output lobe 145a.

As another example, the second output lobe 145c is a representation of the intensity, divergence and propagation direction of light output by the optical extractor 140 in the forward output angular range 145'" when this light reaches a target located far from the optical extractor 140. Here, the light output in the forward output angular range 145'" originates as a portion of the guided light in the angular range 135 that impinges on the one or more transmissive portions of the output surface 143, and where it is transmitted there through to the ambient environment. In this case, a propagation direction of the forward output angular range 145'" is along the about 0° bisector of the second output lobe 145c. Further in this case, a divergence of the first backward output angular range 145' (represented by a width of the first output lobe 145a) is smaller than a divergence of the forward output angular range 145'" (represented by a width of the second output lobe 145c).

In some implementations, in addition to the first output lobe 145a and the second output lobe 145c, the far-field light intensity profile 101 includes a third output lobe 145b representing light output by the illumination device 100 in the second backward output angular range 145". For example, the third output lobe 145b is a representation of the intensity, divergence and propagation direction of light output by the optical extractor 140 in a second output angular range 145" when this output light reaches a target located far from the optical extractor 140. Here, the light output in the second backward output angular range 145" originates as a portion of the guided light in the angular range 135 that impinges on the at least some of the TIR portions of the output surface 143 where it is reflected, via TIR, towards a second lateral output surface (e.g., mirrored relative to an optical axis of the light guide), and where it is transmitted through the second lateral output surface to the ambient environment. In this case, a propagation direction of the second backward output angular range 145" is along the about +130° bisector of the third output lobe 145b. Further in this case, a divergence of the second backward output angular range 145" (represented by a width of the third output lobe 145b) is smaller than the divergence of the forward angular range 145'" (represented by the width of the second output lobe 145c) and about the same as the divergence of the first backward output angular range 145' (represented by the width of the first output lobe 145a).

Notably, the far-field light intensity profile 101 of the illumination device 100 includes a range of angles between +40° and +120° and between −40° and −120° where the emission of light from the optical extractor 140 is minimized. In this region the apparent luminance of the illumination device 100 also is minimized such that luminous intensity and what is often called "glare" into the space would be well managed. In many popular prior art luminaire designs the overall radiation pattern is often a derivative of a typical Lambertian profile such that there are usually emitting surfaces of Lambertian luminance that are in plain view within the users' field of view. One of the primary advantages of the illumination device 100 is that the ratio between the peak intensity of a lobe 145a, 145b or 145c and the minimum intensity between two adjacent lobes (145a and 145c; or 145b and 145c) of the far-field light intensity profile 101 can be very high and readily exceed 5 to 1.

As described in detail below, composition and geometry of the couplers 120, the light guide 130 and the extractor 140 of the illumination device 100 can affect the far-field light intensity profile 101, e.g., the propagation direction and divergence associated with the first output lobe 145a and the second output lobe 145c, and, optionally, of the third output lobe 145b.

Prior to describing multiple embodiments of the illumination device 100 that includes an optical extractor with an output surface having portions shaped to reflect, via TIR, guided light incident thereon, various aspects of light guide illumination devices are described below.

(ii) Light Guide Illumination Devices

Figure 2A:
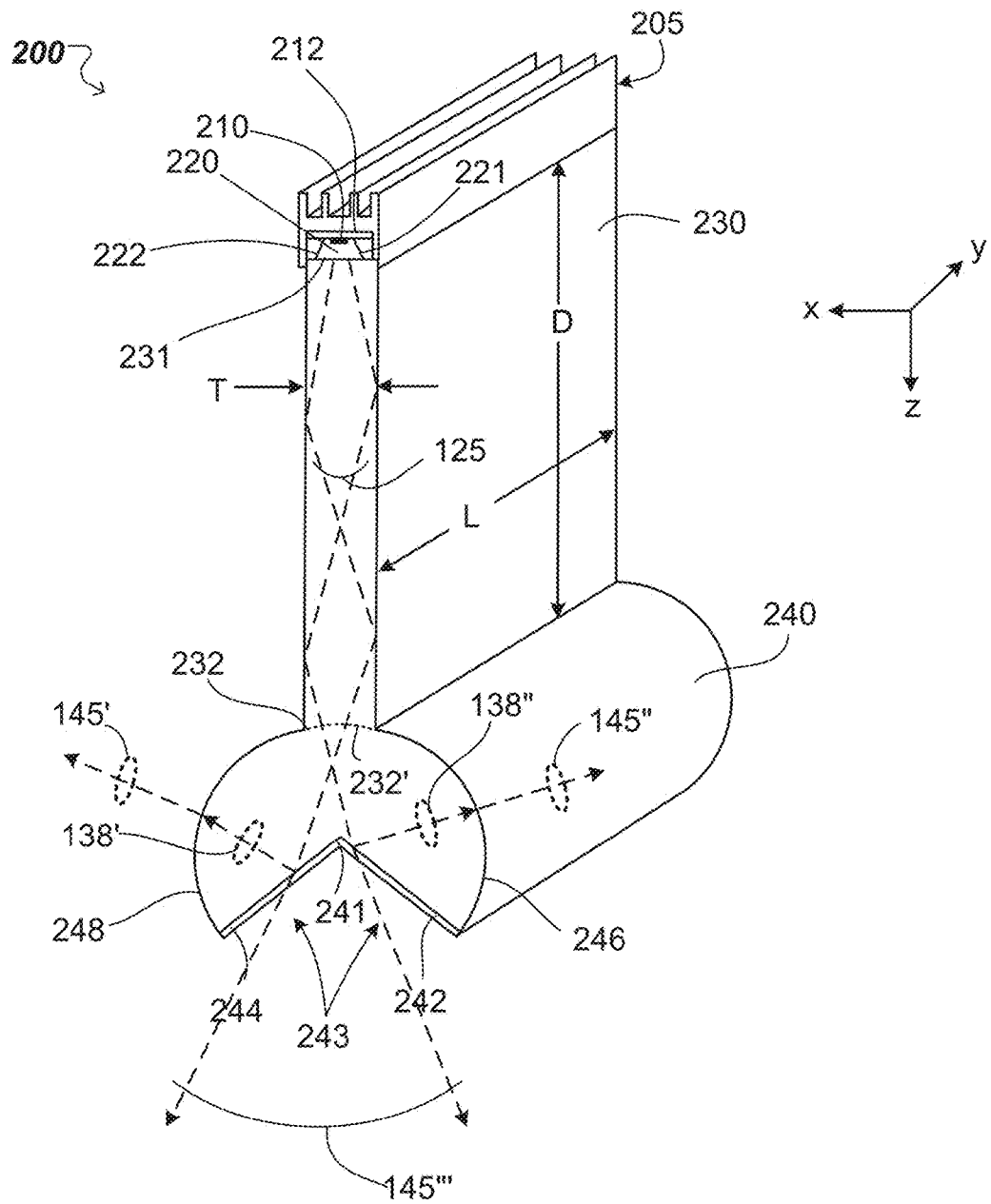

Referring to FIG. 2A, in which a Cartesian coordinate system is shown for reference, a luminaire module 200 includes a mount 212 having a plurality of LEEs 210 distributed along a first surface of the mount 212. The mount with the LEEs 210 is disposed at a first (e.g., upper) edge 231 of a light guide 230. Once again, the positive z-direction is referred to as the "forward" direction and the negative z-direction is the "backward" direction. Sections through the luminaire module 200 parallel to the x-z plane are referred to as the "cross-section" or "cross-sectional plane" of the luminaire module. Also, luminaire module 200 extends along the y-direction, so this direction is referred to as the "longitudinal" direction of the luminaire module. Implementations of luminaire modules can have a plane of symmetry parallel to the y-z plane, be curved or otherwise shaped. This is referred to as the "symmetry plane" of the luminaire module.

Multiple LEEs 210 are disposed on the first surface of the mount 212, although only one of the multiple LEEs 210 is shown in FIG. 2A. For example, the plurality of LEEs 210 can include multiple white LEDs. The LEEs 210 are optically coupled with one or more optical couplers 220 (only one of which is shown in FIG. 2A). An optical extractor 240 is disposed at second (e.g., lower) edge 232 of light guide 230.

Mount 212, light guide 230, and optical extractor 240 extend a length L along the y-direction, so that the luminaire module is an elongated luminaire module with an elongation of L that may be about parallel to a wall of a room (e.g., a ceiling of the room). Generally, L can vary as desired. Typically, L is in a range from about 1 cm to about 200 cm (e.g., 20 cm or more, 30 cm or more, 40 cm or more, 50 cm or more, 60 cm or more, 70 cm or more, 80 cm or more, 100 cm or more, 125 cm or more, or, 150 cm or more).

The number of LEEs 210 on the mount 212 will generally depend, inter alia, on the length L, where more LEEs are used for longer luminaire modules. In some implementations, the plurality of LEEs 210 can include between 10 and 1,000 LEEs (e.g., about 50 LEEs, about 100 LEEs, about 200 LEEs, about 500 LEEs). Generally, the density of LEEs (e.g., number of LEEs per unit length) will also depend on the nominal power of the LEEs and illuminance desired from the luminaire module. For example, a relatively high density of LEEs can be used in applications where high illuminance is desired or where low power LEEs are used. In some implementations, the luminaire module 200 has LEE density along its length of 0.1 LEE per centimeter or more (e.g., 0.2 per centimeter or more, 0.5 per centimeter or more, 1 per centimeter or more, 2 per centimeter or more). The density of LEEs may also be based on a desired amount of mixing of light emitted by the multiple LEEs. In implementations, LEEs can be evenly spaced along the length, L, of the luminaire module. In some implementations, a heat-sink 205 can be attached to the mount 212 to extract heat emitted by the plurality of LEEs 210. The heat-sink 205 can be disposed on a surface of the mount 212 opposing the side of the mount 212 on which the LEEs 210 are disposed. The luminaire module 200 can include one or multiple types of LEEs, for example one or more subsets of LEEs in which each subset can have different color or color temperature.

Optical coupler 220 includes one or more solid pieces of transparent optical material (e.g., a glass material or a transparent plastic, such as polycarbonate or acrylic) having surfaces 221 and 222 positioned to reflect light from the LEEs 210 towards the light guide 230. In general, surfaces 221 and 222 are shaped to collect and at least partially collimate light emitted from the LEEs. In the x-z cross-sectional plane, surfaces 221 and 222 can be straight or curved. Examples of curved surfaces include surfaces having a constant radius of curvature, parabolic or hyperbolic shapes. In some implementations, surfaces 221 and 222 are coated with a highly reflective material (e.g., a reflective metal, such as aluminum or silver), to provide a highly reflective optical interface. The cross-sectional profile of optical coupler 220 can be uniform along the length L of luminaire module 200. Alternatively, the cross-sectional profile can vary. For example, surfaces 221 and/or 222 can be curved out of the x-z plane.

The exit aperture of the optical coupler 220 adjacent upper edge of light guide 231 is optically coupled to edge 231 to facilitate efficient coupling of light from the optical coupler 220 into light guide 230. For example, the surfaces of a solid coupler and a solid light guide can be attached using a material that substantially matches the refractive index of the material forming the optical coupler 220 or light guide 230 or both (e.g., refractive indices across the interface are different by 2% or less.) The optical coupler 220 can be affixed to light guide 230 using an index matching fluid, grease, or adhesive. In some implementations, optical coupler 220 is fused to light guide 230 or they are integrally formed from a single piece of material (e.g., coupler and light guide may be monolithic and may be made of a solid transparent optical material).

Light guide 230 is formed from a piece of transparent material (e.g., glass material such as BK7, fused silica or quartz glass, or a transparent plastic, such as polycarbonate or acrylic) that can be the same or different from the material forming optical couplers 220. Light guide 230 extends length L in the y-direction, has a uniform thickness T in the x-direction, and a uniform depth D in the z-direction. The dimensions D and T are generally selected based on the desired optical properties of the light guide (e.g., which spatial modes are supported) and/or the direct/indirect intensity distribution. During operation, light coupled into the light guide 230 from optical coupler 220 (with an angular range 125) reflects off the planar surfaces of the light guide by TIR and spatially mixes within the light guide. The mixing can help achieve illuminance and/or color uniformity, along the y-axis, at the distal portion of the light guide 232 at optical extractor 240. The depth, D, of light guide 230 can be selected to achieve adequate uniformity at the exit aperture (i.e., at end 232) of the light guide. In some implementations, D is in a range from about 1 cm to about 20 cm (e.g., 2 cm or more, 4 cm or more, 6 cm or more, 8 cm or more, 10 cm or more, 12 cm or more).

In general, optical couplers 220 are designed to restrict the angular range of light entering the light guide 230 (e.g., to within +/−40 degrees) so that at least a substantial amount of the light (e.g., 95% or more of the light) is optically coupled into spatial modes in the light guide 230 that undergoes TIR at the planar surfaces. Light guide 230 can have a uniform thickness T, which is the distance separating two planar opposing surfaces of the light guide. Generally, T is sufficiently large so the light guide has an aperture at first (e.g., upper) surface 231 sufficiently large to approximately match (or exceed) the exit aperture of optical coupler 220. In some implementations, T is in a range from about 0.05 cm to about 2 cm (e.g., about 0.1 cm or more, about 0.2 cm or more, about 0.5 cm or more, about 0.8 cm or more, about 1 cm or more, about 1.5 cm or more). Depending on the implementation, the narrower the light guide the better it may spatially mix light. A narrow light guide also provides a narrow exit aperture. As such light emitted from the light guide can be considered to resemble the light emitted from a one-dimensional linear light source, also referred to as an elongate virtual filament.

While optical coupler 220 and light guide 230 are formed from solid pieces of transparent optical material, hollow structures are also possible. For example, the optical coupler 220 or the light guide 230 or both may be hollow with reflective inner surfaces rather than being solid. As such, material cost can be reduced and absorption in the light guide can be mitigated. A number of specular reflective materials may be suitable for this purpose including materials such as 3M Vikuiti™ or Miro IV™ sheet from Alanod Corporation where greater than 90% of the incident light can be efficiently guided to the optical extractor.

Optical extractor 240 is also composed of a solid piece of transparent optical material (e.g., a glass material or a transparent plastic, such as polycarbonate or acrylic) that can be the same as or different from the material forming light guide 230. In the example implementation shown in FIG. 2A, the optical extractor 240 includes redirecting (e.g., flat) surfaces 242 and 244 and curved surfaces 246 and 248. The flat surfaces 242 and 244 represent first and second portions of a redirecting surface 243, while the curved surfaces 246 and 248 represent first and second output surfaces of the luminaire module 200.

Surfaces 242 and 244 are coated with a reflective material (e.g., a highly reflective metal such as aluminum or silver) over which a protective coating may be disposed. For example, the material forming such a coating may reflect about 95% or more of light incident thereon at appropriate (e.g., visible) wavelengths. Here, surfaces 242 and 244 provide a highly reflective optical interface for light having the angular range 125 entering an input end of the optical extractor 232' from light guide 230. As another example, the surfaces 242 and 244 include portions that are transparent to the light entering at the input end 232' of the optical extractor 240. Here, these portions can be uncoated regions (e.g., partially silvered regions) or discontinuities (e.g., slots, slits, apertures) of the surfaces 242 and 244. In general, different cross-sections of a redirecting surface 243 can have different combinations of disjoint or joined piecewise differentiable curves. As such, some light is transmitted in the forward direction (along the z-axis) through surfaces 242 and 244 of the optical extractor 240 in a forward output angular range 145''. In the example illustrated in FIG. 2A, the light transmitted in the forward output angular range 145''' is refracted. In this way, the redirecting surface 243 acts as a beam splitter rather than a mirror, and transmits in the output angular range 145'' a desired portion of incident light, while reflecting the remaining light in angular ranges 138' and 138''.

In the x-z cross-sectional plane, the lines corresponding to surfaces 242 and 244 have the same length and form an apex or vertex 241, e.g. a v-shape that meets at the apex 241. In general, an included angle (e.g., the smallest included angle between the surfaces 244 and 242) of the redirecting surfaces 242, 244 can vary as desired. For example, in some implementations, the included angle can be relatively small (e.g., from 30° to 60°). In certain implementations, the included angle is in a range from 60° to 120° (e.g., about 90°). The included angle can also be relatively large (e.g., in a range from 120° to 150° or more). In the example implementation shown in FIG. 2A, the output surfaces 246, 248 of the optical extractor 240 are curved with a constant radius of curvature that is the same for both. In an aspect, the output surfaces 246, 248 may have optical power (e.g., may focus or defocus light.) Accordingly, luminaire module 200 has a plane of symmetry intersecting apex 241 parallel to the y-z plane.

The surface of optical extractor 240 adjacent to the lower edge 232 of light guide 230 is optically coupled to edge 232. For example, optical extractor 240 can be affixed to light guide 230 using an index matching fluid, grease, or adhesive. In some implementations, optical extractor 240 is fused to light guide 230 or they are integrally formed from a single piece of material.

The emission spectrum of the luminaire module 200 corresponds to the emission spectrum of the LEEs 210. However, in some implementations, a wavelength-conversion material may be positioned in the luminaire module, for example remote from the LEEs, so that the wavelength spectrum of the luminaire module is dependent both on the emission spectrum of the LEEs and the composition of the wavelength-conversion material. In general, a wavelength-conversion material can be placed in a variety of different locations in luminaire module 200. For example, a wavelength-conversion material may be disposed proximate the LEEs 210, adjacent surfaces 242 and 244 of optical extractor 240, on the exit surfaces 246 and 248 of optical extractor 240, and/or at other locations.

The layer of wavelength-conversion material (e.g., phosphor) may be attached to light guide 230 held in place via a suitable support structure (not illustrated), disposed within the extractor (also not illustrated) or otherwise arranged, for example. Wavelength-conversion material that is disposed within the extractor may be configured as a shell or other object and disposed within a notional area that is circumscribed between $R/n$ and $R*(1+n^2)^{(-1/2)}$, where R is the radius of curvature of the light-exit surfaces (246 and 248 in FIG. 2A) of the extractor 240 and n is the index of refraction of the portion of the extractor that is opposite of the wavelength-conversion material as viewed from the reflective surfaces (242 and 244 in FIG. 2A). The support structure may be a transparent self-supporting structure. The wavelength-conversion material diffuses light as it converts the wavelengths, provides mixing of the light and can help uniformly illuminate a surface of the ambient environment.

During operation, light exiting light guide 230 through end 232 impinges on the reflective interfaces at portions of the redirecting surface 242 and 244 and is reflected outwardly towards output surfaces 246 and 248, respectively, away from the symmetry plane of the luminaire module. The first portion of the redirecting surface 242 provides light having an angular distribution 138'' towards the output surface 246, the second portion of the redirecting surface 244 provides light having an angular distribution 138' towards the output surface 248. The light exits optical extractor through output surfaces 246 and 248. In general, the output surfaces 246 and 248 have optical power, to redirect the light exiting the optical extractor 240 in angular ranges 145' and 145'', respectively. For example, optical extractor 240 may be configured to emit light upwards (i.e., towards the plane intersecting the LEEs and parallel to the x-y plane), downwards (i.e., away from that plane) or both upwards and downwards. In general, the direction of light exiting the luminaire module through surfaces 246 and 248 depends on the divergence of the light exiting light guide 230 and the orientation of surfaces 242 and 244.

Surfaces 242 and 244 may be oriented so that little or no light from light guide 230 is output by optical extractor 240 in certain directions. In implementations where the luminaire module 200 is attached to a ceiling of a room (e.g., the forward direction is towards the floor) such configurations can help avoid glare and an appearance of non-uniform illuminance.

In general, the light intensity distribution provided by luminaire module 200 reflects the symmetry of the luminaire module's structure about the y-z plane. For example, referring to FIG. 1B, light output in angular range 145' corresponds to the first output lobe 145a of the far-field light intensity distribution 101, light output (leaked) in forward angular range 145''' corresponds to the second output lobe 145c of the far-field light intensity distribution 101, and light output in angular range 145'' corresponds to the third output lobe 145b of the far-field light intensity distribution 101. In general, an intensity profile of luminaire module 200 will depend on the configuration of the optical coupler 220, the light guide 230 and the optical extractor 240. For instance, the interplay between the shape of the optical coupler 220, the shape of the redirecting surface 243 of the optical extractor 240 and the shapes of the output surfaces 246, 248 of the optical extractor 240 can be used to control the angular width and prevalent direction (orientation) of the output first 145a and third 145b lobes in the far-field light intensity profile 101. Additionally, a ratio of an amount of light in the combination of first 145a and third 145b output lobes and light in the second output lobe 145c is controlled by reflectivity and transmissivity of the redirecting surfaces 242 and 244. For example, for a reflectivity of 90% and transmissivity of 10% of the redirecting surfaces 242, 244, 45% of light can be output in the output angular range 145' corresponding to the first output lobe 145a, 45% light can be output in the output angular range 145'' corresponding to the third output lobe 145b, and 10% of light can be output in the forward angular range 145''' corresponding to the second output lobe 145c.

In some implementations, the orientation of the output lobes 145a, 145b can be adjusted based on the included angle of the v-shaped groove 241 formed by the portions of the redirecting surface 242 and 244. For example, a first included angle results in a far-field light intensity distribution 101 with output lobes 145a, 145b located at relatively smaller angles compared to output lobes 145a, 145b of the far-field light intensity distribution 101 that results for a second included angle larger than the first angle. In this manner, light can be extracted from the luminaire module 200 in a more forward direction for the smaller of two included angles formed by the portions 242, 244 of the redirecting surface 243.

Furthermore, while surfaces 242 and 244 are depicted as planar surfaces, other shapes are also possible. For example, these surfaces can be curved or faceted. Curved redirecting surfaces 242 and 244 can be used to narrow or widen the output lobes 145a, 145b. Depending of the divergence of the angular range 125 of the light that is received at the input end of the optical extractor 232', concave reflective surfaces 242, 244 can narrow the lobes 145a, 145b output by the optical extractor 240 (and illustrated in FIG. 1B), while convex reflective surfaces 242, 244 can widen the lobes 145a, 145b output by the optical extractor 240. As such, suitably configured redirecting surfaces 242, 244 may introduce convergence or divergence into the light. Such surfaces can have a constant radius of curvature, can be parabolic, hyperbolic, or have some other curvature.

In general, the geometry of the elements can be established using a variety of methods. For example, the geometry can be established empirically. Alternatively, or additionally, the geometry can be established using optical simulation software, such as Lighttools™, Tracepro™, FRED™ or Zemax™, for example.

In general, luminaire module 200 can be designed to output light into different output angular ranges 145', 145'' from those shown in FIG. 2A. In some implementations, illumination devices can output light into lobes 145a, 145b that have a different divergence or propagation direction than those shown in FIG. 1B. For example, in general, the output lobes 145a, 145b can have a width of up to about 90° (e.g., 80° or less, 70° or less, 60° or less, 50° or less, 40° or less, 30° or less, 20° or less). In general, the direction in which the output lobes 145a, 145b are oriented can also differ from the directions shown in FIG. 1B. The "direction" refers to the direction at which a lobe is brightest. In FIG. 1B, for example, the output lobes 145a, 145b are oriented at approx. −130° and approximately +130°. In general, output lobes 145a, 145b can be directed more towards the horizontal (e.g., at an angle in the ranges from −90° to −135°, such as at approx. −90°, approx. −100°, approx. −110°, approx. −120°, approx. −130°, and from +90° to +135°, such as at approx. +90°, approx. +100°, approx. +110°, approx. +120°, approx. +130°.

The luminaire modules can include other features useful for tailoring the intensity profile. For example, in some implementations, luminaire modules can include an optically diffuse material that can diffuse light in a controlled manner to aid homogenizing the luminaire module's intensity profile. For example, surfaces 242 and 244 can be roughened or a diffusely reflecting material, rather than a specular reflective material, can be coated on these surfaces. Accordingly, the optical interfaces at surfaces 242 and 244 can diffusely reflect light, scattering light into broader lobes than would be provided by similar structures utilizing specular reflection at these interfaces. In some implementations these surfaces can include structure that facilitates various intensity distributions. For example, surfaces 242 and 244 can each have multiple planar facets at differing orientations. Accordingly, each facet will reflect light into different directions. In some implementations, surfaces 242 and 244 can have structure thereon (e.g., structural features that scatter or diffract light).

Surfaces 246 and 248 need not be surfaces having a constant radius of curvature. For example, surfaces 246 and 248 can include portions having differing curvature and/or can have structure thereon (e.g., structural features that scatter or diffract light). In certain implementations, a light scattering material can be disposed on surfaces 246 and 248 of optical extractor 240.

In some implementations, optical extractor 240 is structured so that a negligible amount (e.g., less than 1%) of the light propagating within at least one plane (e.g., the x-z cross-sectional plane) that is reflected by surface 242 or 244 experiences TIR at light-exit surface 246 or 248. For certain spherical or cylindrical structures, a so-called Weierstrass condition can avoid TIR. A Weierstrass condition is illustrated for a circular structure (i.e., a cross section through a cylinder or sphere) having a surface of radius R and a concentric notional circle having a radius R/n, where n is the refractive index of the structure. Any light ray that passes through the notional circle within the cross-sectional plane is incident on surface of the circular structure and has an angle of incidence less than the critical angle and will exit the circular structure without experiencing TIR. Light rays propagating within the spherical structure in the plane but not emanating from within notional surface can impinge on the surface of radius R at the critical angle or greater angles of incidence. Accordingly, such light may be subject to TIR and won't exit the circular structure. Furthermore, rays of p-polarized light that pass through a notional space circumscribed by an area with a radius of curvature that is smaller than $R/(1+n^2)^{(-1/2)}$, which is smaller than R/n, will be subject to small Fresnel reflection at the surface of radius R when exiting the circular structure. This condition may be referred to as Brewster geometry. Implementations may be configured accordingly.

Referring again to FIG. 2A, in some implementations, all or part of surfaces 242 and 244 may be located within a notional Weierstrass surface defined by surfaces 246 and 248. For example, the portions of surfaces 242 and 244 that receive light exiting light guide 230 through end 232 can reside within this surface so that light within the x-z plane reflected from surfaces 242 and 244 exits through surfaces 246 and 248, respectively, without experiencing TIR.

FIG. 2B shows an embodiment 200' of the luminaire module 200 that also is elongated along an axis (e.g., y-axis) perpendicular to the forward direction (e.g., along the z-axis.) In this case, a length L of the light guide 230 along the elongated dimension of the luminaire module 200' can be 2', 4' or 8', for instance. A thickness T of the light guide 230 orthogonal to the elongated dimension L (e.g., along the x-axis) is chosen to be a fraction of the distance D traveled by the guided light from the receiving end to the opposing end of the light guide 230. For T=0.05D, 0.1D or 0.2D, for instance, light from multiple, point-like LEEs 210—distributed along the elongated dimension L—that is edge-coupled into the light guide 230 at the receiving end can efficiently mix and become uniform (quasi-continuous) along the y-axis by the time it propagates to the opposing end.

FIG. 2C shows a luminaire module 200'' that has (e.g., continuous or discrete) rotational symmetry about the forward direction (e.g., z-axis.) Here, a diameter T of the light guide 230 is a fraction of the distance D traveled by the guided light from the receiving end to the opposing end of the light guide 230. For example, the diameter of the light guide 230 can be T=0.05D, 0.1D or 0.2D, for instance.

Other open and closed shapes of the luminaire module 200 are possible. FIGS. 2D and 2E show a perspective view and a bottom view, respectively, of a luminaire module 200''' for which the light guide 230 has two opposing side surfaces 232a, 232b that form a closed cylinder shell of thickness T. In the example illustrated in FIGS. 2D and 2E, the x-y cross-section of the cylinder shell formed by the opposing side surfaces 232a, 232b is oval. In other cases, the x-y cross-section of the cylinder shell can be circular or can have other shapes. Some implementations of the example luminaire module 200''' may include a specular reflective coating on the side surface 232a of the light guide 230. For T=0.05D, 0.1D or 0.2D, for instance, light from multiple, point-like LEEs 210—distributed along an elliptical path of length L—that is edge-coupled into the light guide 230 at the receiving end can efficiently mix and become uniform (quasi-continuous) along such an elliptical path by the time it propagates to the opposing end.

Figure 2F:
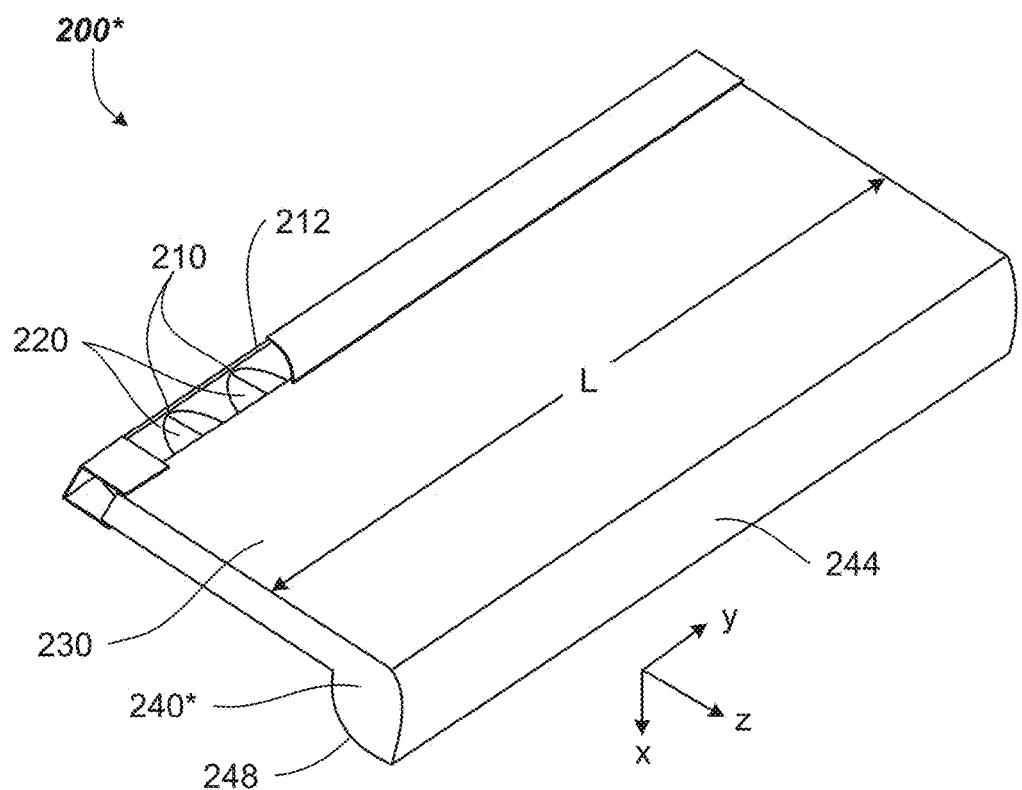

In the example implementations described above in connection with FIG. 2A, the luminaire module 200 is configured to output light into output angular ranges 145' and 145''. In other implementations (e.g., see FIG. 2F), the light guide-based luminaire module is modified to output light into a single output angular range 145'. Such light guide-based luminaire module configured to output light on a single side of the light guide is referred to as a single-sided luminaire module and is denoted 200*. The single-sided luminaire module 200* is elongated along the y-axis like the luminaire module 200 shown in FIG. 2A. Also like the luminaire module 200, the single-sided luminaire module 200* includes a mount 212 and LEEs 210 disposed on a surface of the mount 212 along the y-axis to emit light in a first angular range. The single-sided luminaire module 200* further includes optical couplers 220 arranged and configured to redirect the light emitted by the LEEs 210 in the first angular range into a second angular range 125 that has a divergence smaller than the divergence of the first angular range at least in the x-z cross-section. Also, the single-sided luminaire module 200* includes a light guide 230 to guide the light redirected by the optical couplers 220 in the second angular range 125 from a first end 231 of the light guide to a second end 232 of the light guide. Additionally, the single-sided luminaire module 200* includes a single-sided extractor (denoted 240*) to receive the light guided by the light guide 230. The single-sided extractor 240* includes a redirecting surface 244 to redirect the light received from the light guide 230 into a third angular range 138', like described for luminaire module 200 with reference to FIG. 2A, and an output surface 248 to output the light redirected by the redirecting surface 244 in the third angular range 138' into a fourth angular range 145'.

A light intensity profile of the single-sided luminaire module 200* is represented in FIG. 1B as a first output lobe 145a and the second output lobe 145c. The first output lobe 145a corresponds to light output by the single-sided luminaire module 200* in the fourth angular range 145' and the second output lobe 145c corresponds to light transmitted (leaked) by the single-sided luminaire module 200* in the forward direction (along the z-axis.)

Luminaire modules like the ones described in this section can be used to obtain luminaire modules for which the optical extractor has an output surface with portions shaped to reflect, via TIR, guided light incident thereon.

Figure 3A:
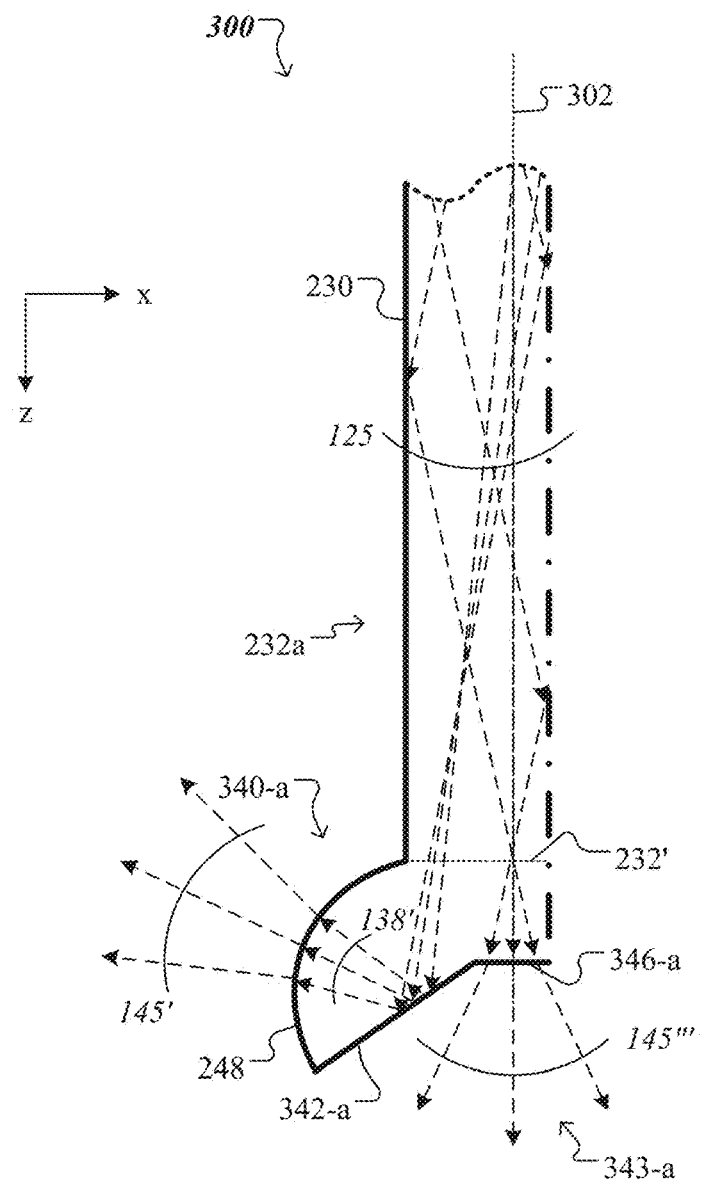
FIGS. 3A-3D show aspects of light guide luminaire modules that include an optical extractor with an output surface having portions shaped to reflect, via TIR, guided light incident thereon.
Figure 3B:
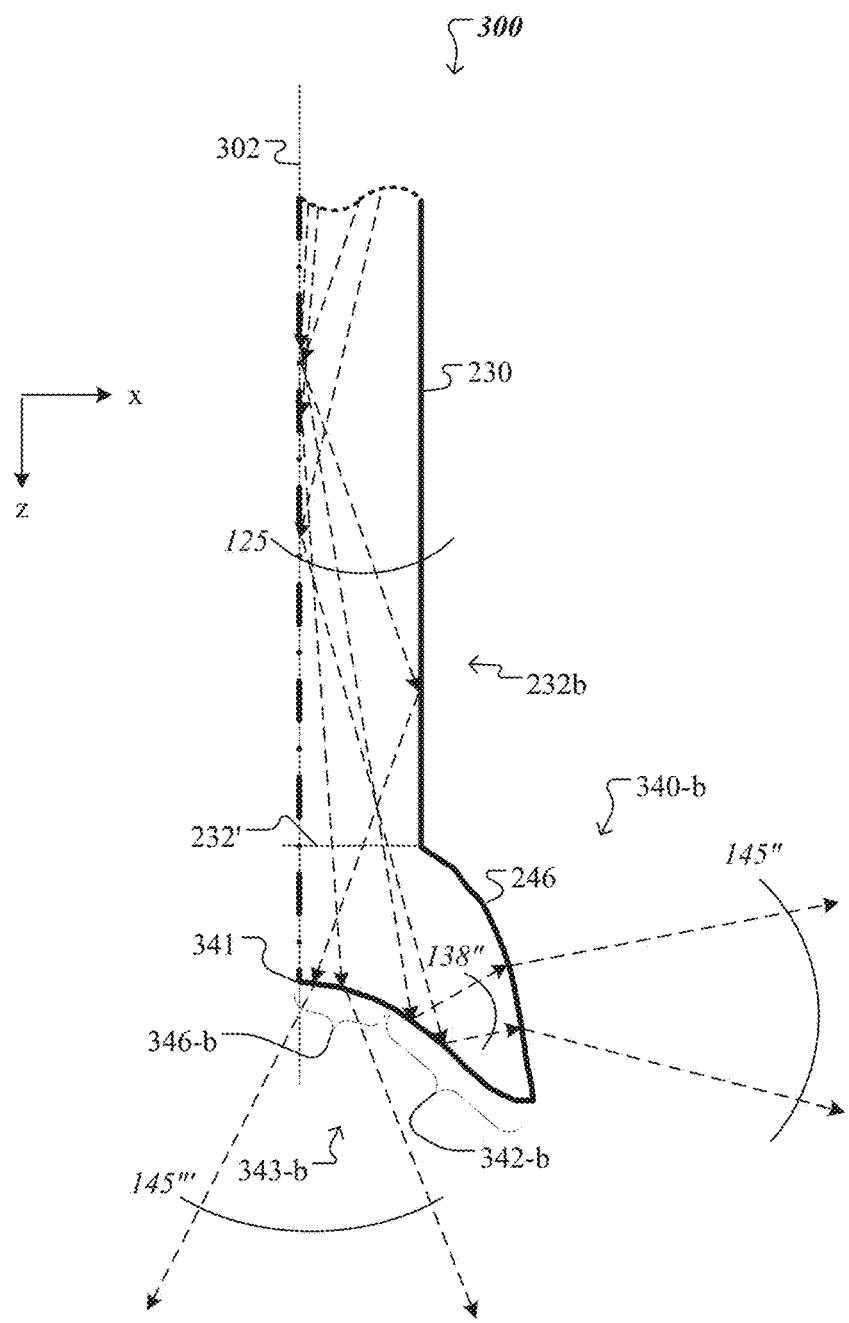
Figure 3C:
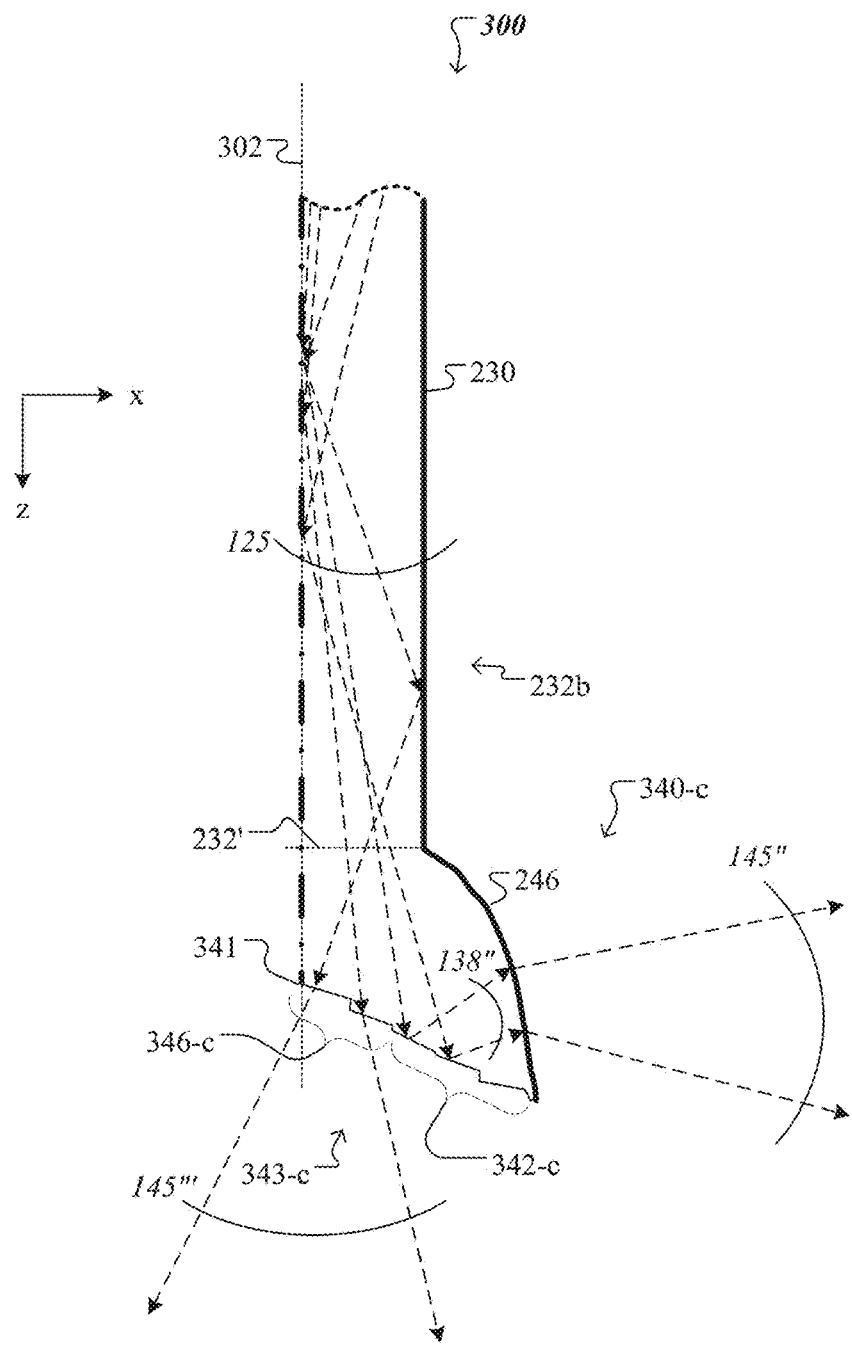
Figure 3D:
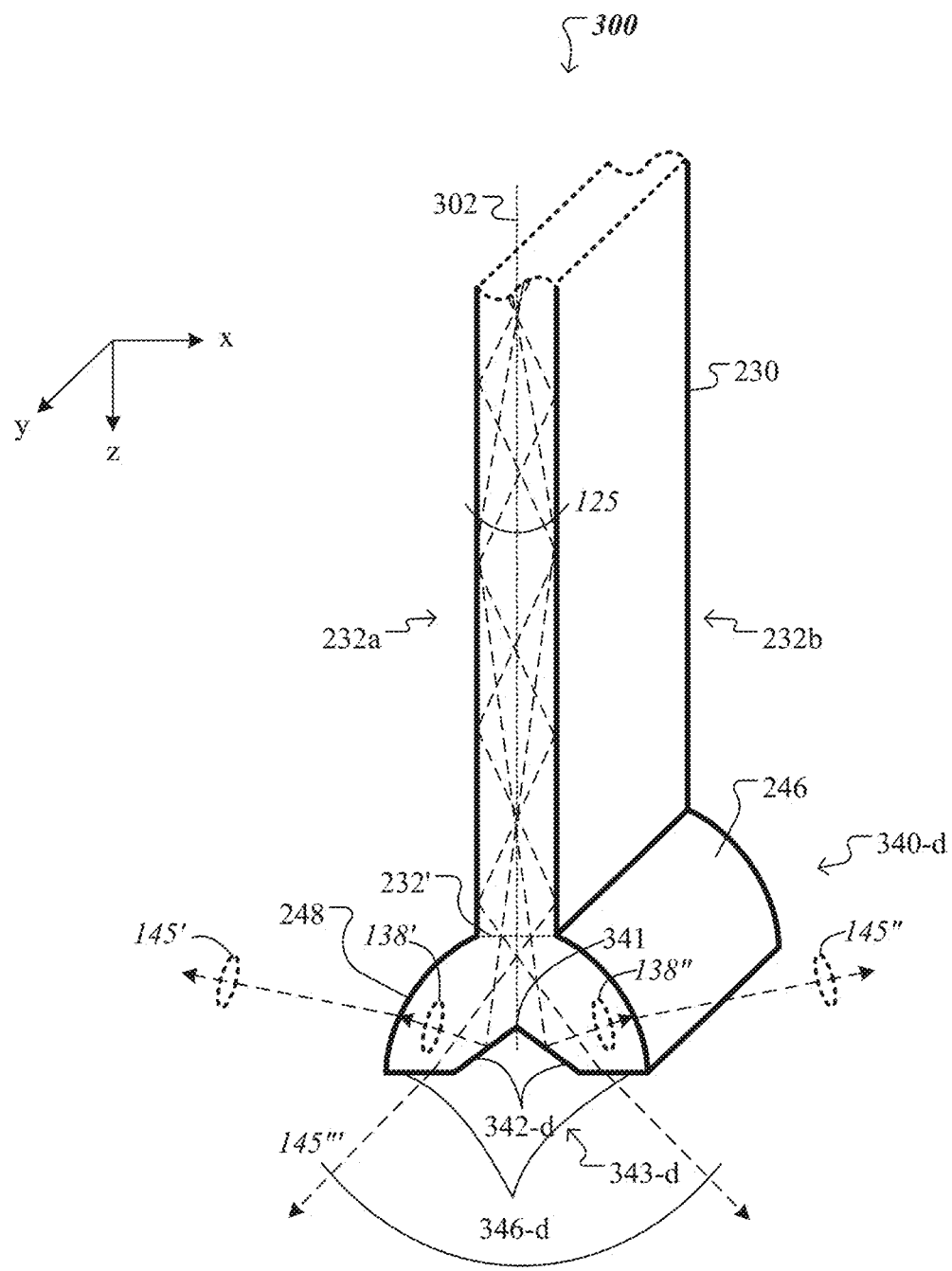

(iii) Light Guide Luminaire Module that Includes an Optical Extractor with an Output Surface Having Portions Shaped to Reflect, Via TIR, Guided Light Incident Thereon FIGS. 3A-3D show aspects of an illumination device 300 that includes an optical extractor 340-j with an output surface 343-j having one or more light reflecting portions 342-j shaped to reflect, via TIR, light incident thereon, where j={a, b, c, d}. Such light reflecting portions are referred to as TIR portions 342-j of the output surface 343-j. Additionally, the output surface 343-j also has one or more light transmitting portions 346-j. The latter are referred to as transmissive portions 346-j. In this example, the illumination device 300 also includes LEEs (not shown in FIGS. 3A-3D) and a light guide 230. As such, the illumination device 300 is referred to, interchangeably, as a light guide luminaire module 300. Here, the illumination device 300 has an elongated configuration, e.g., with a longitudinal dimension L along the y-axis, perpendicular to the page, as illustrated in FIG. 3D. In this case, L can be 1', 2' or 4', for instance. In other implementations, the illumination device 300 can have another elongated configuration, as illustrated in FIGS. 2D-2E. In some other implementations, the illumination device 300 can have a non-elongated configuration, e.g., with rotational symmetry around the z-axis, as illustrated in FIG. 2C. In some implementations, the illumination device 300 also includes one or more couplers (not shown in FIGS. 3A-3D) to collimate the light emitted by the LEEs prior to injection into the light guide 230.

The LEEs are disposed on a substrate and have a structure similar to a structure of the LEEs 110 of the illumination device 100 described above in connection with FIG. 1A or a structure of the LEEs 210 of the luminaire modules 200, 200', 200", 200'", 200* described above in connection with FIGS. 2A-2F. Further, the optical couplers—included in some implementations of the illumination device 300—have a structure similar to a structure of the optical couplers 120 of the illumination device 100 described above in connection with FIG. 1A or a structure of the optical couplers 220 of the luminaire modules 200, 200', 200", 200'", 200* described above in connection with FIGS. 2A-2F. Furthermore, the light guide 230 is the same light guide of the luminaire modules 200, 200', 200", 200'", 200* described above in connection with FIGS. 2A-2F or has a structure similar to a structure of the light guide 130 of the illumination device 100 described above in connection with FIG. 1A. Here, the light guide 230 has a length D along the z-axis, e.g., D=10, 20, 50 cm, from a receiving end to an opposing end, and a thickness T along the x-axis that can be much smaller than the length D, e.g., T≈5% D, 10% D or 20% D. When part of the illumination device 300, the optical couplers are optically coupled to the input end of the light guide 230. In some implementations, the optical couplers are bonded to the input end of the light guide 230. In other implementations, the optical couplers and the light guide 230 are integrally formed.

The optical extractor 340-$j$, where j={a, b, c, d}, is made from a solid, transparent material. For example, the material can be glass with a refractive index of about 1.5. As another example, the material can be plastic with a refractive index of about 1.5-1.6. The optical extractor 340-$j$ has an input aperture 232' that is coupled to the output end of the light guide 230 to receive the guided light. Note that here, the guided light received by the optical extractor 340-$j$ has an angular range 125 with a forward direction of propagation (e.g., along the z-axis.)

Moreover, the optical extractor 340-$j$ illustrated in FIGS. 3A-3D includes an output surface 343-$j$ and one or more lateral output surfaces 246 and 248. The output surface 343-$j$ is spaced apart from and opposite to the input aperture 232'. In these examples, the output surface 343-$j$ is configured as various modifications of a "v-groove" design. As such, the lateral output surface 246 is disposed to the right side of the optical axis 302 and extends from a right end of the output surface 343-$j$ to a right lateral face 232-$b$ of the light guide 230. Further, the lateral surface 248 is disposed to the left side of the optical axis 302 and extends from a left end of the output surface 343-$j$ to a left lateral face 232-$a$ of the light guide 230.

Moreover, the output surface 343-$j$ has one or more TIR portions 342-$j$ and one or more transmissive portions 346-$j$, where j={a, b, c, d}. Here, a TIR portion 342-$j$ is a region of the output surface 343-$j$ that is arranged relative to the input aperture 232' and shaped to reflect, via TIR, all guided light with angular range 125 received from the light guide 230. In this manner, a shape and/or orientation of the TIR portion 342-$j$ are such that the guided light impinges thereon at an angle of incidence larger than a critical angle associated with an optical interface between the optical extractor 340-$j$ and the ambient environment (e.g., air). As such, all the guided light impinging on the TIR portion(s) 343-$j$ is reflected, via TIR, back into the optical extractor 340-$j$ with a reflective angular range 138' or 138". A transmissive portion 346-$j$ is another region of the output surface 143 that is arranged relative to the input aperture 232' and shaped to transmit the guided light. In this manner, a shape and/or orientation of the transmissive portion 346-$j$ are such that the guided light impinges thereon at an angle of incidence smaller than a critical angle associated with an optical interface between the optical extractor 340-$j$ and the ambient environment (e.g., air). As such, substantially all light impinging on the transmissive portion(s) 346-$j$ is transmitted there through into the ambient environment as forward output light, except for a small fraction of the impinging light, e.g., 4% or less, that is reflected via Fresnel reflection. The output light transmitted through the transmissive portion(s) 346-$j$ of the output surface 343-$j$ has a forward output angular range 145".

The light reflected, via TIR, by the TIR portions 342-$j$ of the output surface 343-$j$ has an angular range 138' or 138" and is directed towards the one or more lateral output surfaces 246, 248 of the optical extractor 340-$j$. Light that reaches the lateral output surface(s) 246, 248 is transmitted there through into the ambient environment as backward output light. The backward output light has a backward output angular range 145' or 145". In the examples illustrated in FIGS. 3A-4B, each of the lateral output surfaces 246, 248 is curved so the angular range 138' or 138" of the light incident on the lateral output surfaces 246 or 248 is controllably modified to the backward output angular range 145' or 145" upon transmission there through.

Various embodiments of the output surface 343-$j$ of the optical extractor 340-$j$, where j={a, b, c, d}, are illustrated in FIGS. 3A-3D.

FIG. 3A shows a portion of the illumination device 300 with the optical extractor 340-$a$. The remaining portion of the illumination device 300, which is not shown in FIG. 3A, can have mirror-symmetry relative the optical axis 302, for instance. Referring now to the output surface 343-$a$ of the optical extractor 340-$a$ illustrated in FIG. 3A, the transmissive portion 346-$a$ of the output surface 343-$a$ is disposed adjacent to the optical axis 302. The TIR portion 342-$a$ of the output surface 343-$a$ is displaced laterally from the optical axis 302. Here, the TIR portion 342-$a$ intersects the transmissive portion 346-$a$ at one end and the curved lateral output surface 248 at the opposing end. In this example, the TIR portion 342-$a$ is a flat facet and is tilted relative to the optical axis 302, such that guided light—from an outer portion of the angular range 125—that impinges anywhere on the TIR portion 342-$a$ forms an incidence angle that is larger than the critical angle. As such, the TIR portion 342-$a$ reflects, via TIR, the guided light incident thereon within a reflective angular range 138'. Further in this example, the transmissive portion 346-$a$ is a flat facet, is oriented normal to the optical axis 302 and has a transverse size (e.g., along the x-axis), such that guided light—from an inner portion of the angular range 125—that impinges anywhere on the transmissive facet 346-$a$ forms an incidence angle that is smaller than the critical angle. As such, the transmissive facet 346-$a$ transmits the guided light incident thereon to the ambient environment in a forward angular range 145'". Here, an intersection of the TIR facet 342-$a$ and the transmissive facet 346-$a$ forms a kink.

FIG. 3B shows a portion of the illumination device 300 with the optical extractor 340-$b$. The remaining portion of the illumination device 300, which is not shown in FIG. 3B, can have mirror-symmetry relative the optical axis 302, for instance. Referring now to the output surface 343-$b$ of the optical extractor 340-*b* illustrated in FIG. 3B, the transmissive portion 346-*b* of the output surface 343-*b* is disposed adjacent to the optical axis 302. In this case an apex 341 of the output surface 340*b* is located on the transmissive portion 346-*b*. The TIR portion 342-*b* of the output surface 343-*b* is displaced laterally from the optical axis 302. Here, the TIR portion 342-*b* intersects the transmissive portion 346-*b* at one end and the curved lateral output surface 246 at the opposing end. In this example, the TIR portion 342-*b* has a smoothly curved surface with an overall tilt relative to the optical axis 302, such that guided light—from an outer portion of the angular range 125—that impinges anywhere on the TIR portion 342-*b* forms an incidence angle that is larger than the critical angle. As such, the TIR portion 342-*b* reflects, via TIR, the guided light incident thereon within a reflective angular range 138". Further in this example, the transmissive portion 346-*b* has another smoothly curved surface (except for a single kink at the apex 341) with another overall tilt relative to the optical axis 302, such that guided light—from an inner portion of the angular range 125—that impinges anywhere on the transmissive portion 346-*b* forms an incidence angle that is smaller than the critical angle. As such, the transmissive portion 346-*b* transmits the guided light incident thereon to the ambient environment in a forward angular range 145". Here, an intersection of the TIR portion 342-*b* and the transmissive portion 346-*b* is smooth, because a slope of the TIR portion 342-*b* matches a slope of the transmissive portion 346-*b* at the intersection.

FIG. 3C shows a portion of the illumination device 300 with the optical extractor 340-*c*. The remaining portion of the illumination device 300, which is not shown in FIG. 3C, can have mirror-symmetry relative the optical axis 302, for instance. Referring now to the output surface 343-*c* of the optical extractor 340-*c* illustrated in FIG. 3C, the transmissive portion 346-*c* of the output surface 343-*c* is disposed adjacent to the optical axis 302. In this case an apex 341 of the output surface 340*c* is located on the transmissive portion 346-*c*. The TIR portion 342-*c* of the output surface 343-*c* is displaced laterally from the optical axis 302. Here, the TIR portion 342-*c* intersects the transmissive portion 346-*c* at one end and the curved lateral output surface 246 at the opposing end. In this example, the TIR portion 342-*c* has a faceted curved surface with an overall tilt relative to the optical axis 302, such that guided light—from an outer portion of the angular range 125—that impinges anywhere on the TIR portion 342-*c* forms an incidence angle that is larger than the critical angle. As such, the TIR portion 342-*c* reflects, via TIR, the guided light incident thereon within a reflective angular range 138". Note that here, in contrast to the example illustrated in FIG. 3A, the TIR portion 342-*c* includes two or more facets, and at least some of the facets of the TIR portion 342-*c* are curved. Further in the example illustrated in FIG. 3C, the transmissive portion 346-*c* has another faceted curved surface with another overall tilt relative to the optical axis 302, such that guided light—from an inner portion of the angular range 125—that impinges anywhere on any of the facets of the transmissive portion 346-*c* forms an incidence angle that is smaller than the critical angle. As such, the transmissive portion 346-*c* transmits the guided light incident thereon to the ambient environment in a forward angular range 145". In some implementations, an intersection of the TIR portion 342-*c* and the transmissive portion 346-*c* is discontinuous, when a facet of the TIR portion 342-*c* and a facet of the transmissive portion 346-*c* meet to form a step or a kink. In other implementations, an intersection of the TIR portion 342-*c* and the transmissive portion 346-*c* is smooth, when a facet of the TIR portion 342-*c* and a facet of the transmissive portion 346-*c* meet with matching heights and slopes.

FIG. 3D shows a portion of the illumination device 300 with the optical extractor 340-*d*. Here, the TIR portion 342-*d* of the output surface 343-*d* is disposed adjacent to the optical axis 302. In this case an apex 341 of the output surface 343-*d* is located on the TIR portion 342-*d*. The transmissive portions 346-*d* of the output surface 343-*d* are displaced laterally from the optical axis 302. Here, a first one of the transmissive portions 346-*d* intersects the TIR portion 342-*d* at one end and the first curved lateral output surface 248 at the opposing end. Also, the second one of the transmissive portions 346-*d* intersects the TIR portion 342-*d* at one end and the second curved lateral output surface 248 at the opposing end. In this example, the TIR portion 342-*a* is formed as a v-groove with flat facets that meet at the apex 341 and form a particular angle, such that guided light—from an inner portion of the angular range 125—that impinges anywhere on the TIR portion 342-*d* forms an incidence angle that is larger than the critical angle. As such, the TIR v-groove 342-*d* reflects, via TIR, the guided light incident thereon within reflective angular ranges 138' and 138". Further in this example, each of the transmissive portions 346-*d* is a flat facet, is oriented normal to and has a displacement from the optical axis 302, and has a transverse size (e.g., along the x-axis), such that guided light—from outer portions of the angular range 125—that impinges anywhere on the transmissive facets 346-*d* forms an incidence angle that is smaller than the critical angle. As such, the transmissive facets 346-*d* transmit the guided light incident thereon to the ambient environment in a forward angular range 145". Here, intersections of the TIR v-groove 342-*d* and the transmissive facets 346-*a* form respective kinks.

In this manner, regardless of the optical extractor 340-*j* illustrated in FIGS. 3A-3D the light reflected, via TIR, by the TIR portions 342-*j* of the output surface 343-*j* is directed towards the lateral output surfaces 246, 248 of the optical extractor 340-*j*. Light that reaches the lateral output surfaces 246, 248 is transmitted there through into the ambient environment as backward output light. As such, the light transmitted through a first lateral output surface 248 is output by the extractor 340-*j* within a first backward output angular range 145'. The first backward output angular range 145' can be substantially continuous along the y-axis and has a first output propagation direction with a component along a backward direction (or opposite to the forward direction, e.g., antiparallel to the z-axis.) Further, the light transmitted through a second lateral output surface 246 is output by the extractor 340-*j* within a second backward output angular range 145". The second backward output angular range 145" can be substantially continuous along the y-axis and has a third output propagation direction with a component along the backward direction. Here, the first output propagation direction and the third output propagation direction have respective components orthogonal to the forward direction that are opposite (antiparallel) to each other (antiparallel and parallel to the x-axis.) Additionally, the light transmitted through the transmissive portions 346-*j* of the output surface 343-*j* is output by the optical extractor 340-*j* within a forward output angular range 145'". The forward output angular range 145'" can be substantially continuous along the y-axis and has a second output propagation direction with a component along the forward direction (e.g., along the z-axis.)

Note that a brightness of forward illumination (e.g., "downward" illumination when the illumination device 300 is attached to the ceiling of a room) provided by the illumination device 300 with optical extractor 340-$j$, where $j=\{a, b, c, d\}$, is controlled by adjusting a combination of the amount of light output by the optical extractor 340-$j$ in the forward angular range 145''' and an area over which that forward light is provided. As such, a parameter that controls the brightness of the forward illumination for the illumination device 300 with optical extractor 340-$j$ is a ratio between a total area $A_{342}$ of the TIR portions 342-$j$ of the output surface 343-$j$ and a total area $A_{346}$ of the transmissive portions 346-$j$ of the output surface 343-$j$. As such, when a person looks directly to the output surface 343-$j$ of the extractor 340-$j$, the output surface 343-$j$ will appear more bright for configurations of the output surface 343-$j$ with large values of the ratio of $A_{342}/A_{346}$, or less bright for configurations of the output surface 343-$j$ with small values of the ratio of $A_{342}/A_{346}$.

In other implementations of the technologies described herein in connection with FIG. 1A, the output surface 143 and the one or more lateral output surfaces are shaped to refract and reflect impinging rays into refracted and reflected rays in such proportions and directions that forward (or downward) light output through the output surface 143 can provide direct illumination and backward (or side or up) light output through the lateral output surface(s) can provide indirect illumination via a ceiling or other surface, for example. A particular utility of the direct and indirect light distributions (e.g., represented in terms of forward angular range 145''' and backward angular ranges 145', 145'') for space illumination applications will be determined by the particular configuration of the output surface 143 and lateral output surface(s) in combination with the distribution of light (e.g., represented in terms of forward angular range 125) that the light guide 130 provides to the extractor 140. As described above, the shapes of the output surface 143 and lateral output surface(s) in combination per se do not necessarily require coatings or fine geometrical structures. TIR at the output surface 143 is neither required nor excluded. Depending on the rays impinging on output surface 143, some TIR may occur for some rays within some regions or no TIR may occur at all. If TIR occurs for some rays at some portions of the output surface 143, other rays at those portions or other portions of the output surface 143 should transmit some incoming light. For efficiency reasons, light that does TIR at some portions of the output surface 143, particularly in response to "primary", or "first order" rays from the light guide 130, should impinge the lateral output surface(s) preferably at shallow incidence angles (rather than propagate back up the light guide 130).

The preceding figures and accompanying description illustrate example methods, systems and devices for illumination. It will be understood that these methods, systems, and devices are for illustration purposes only and that the described or similar techniques may be performed at any appropriate time, including concurrently, individually, or in combination. In addition, many of the steps in these processes may take place simultaneously, concurrently, and/or in different orders than as shown. Moreover, the described methods/devices may use additional steps/parts, fewer steps/parts, and/or different steps/parts, as long as the methods/devices remain appropriate.

In other words, although this disclosure has been described in terms of certain aspects or implementations and generally associated methods, alterations and permutations of these aspects or implementations will be apparent to those skilled in the art. Accordingly, the above description of example implementations does not define or constrain this disclosure. Further implementations are described in the following claims.

What is claimed is:

1. An illumination device comprising:
   a plurality of light-emitting elements (LEEs);
   a light guide extending in a forward direction from a first end of the light guide along an optical axis of the light guide to a second end of the light guide, the light guide being positioned to receive at the first end light emitted by the LEEs and configured to guide the received light to the second end; and
   an optical extractor optically coupled to the light guide at the second end to receive the guided light, the optical extractor being formed from a transparent, solid material and comprising:
      a first output surface including a transmissive portion arranged and shaped to transmit a first portion of the guided light to the ambient environment in a forward angular range and a reflective portion arranged and shaped to reflect via total internal reflection (TIR) all the guided light incident on the reflective portion, and
      a second output surface that is disposed distal from the optical axis, at least a portion of the second output surface being between the first output surface and the plurality of LEEs along the optical axis, the second output surface having a curvilinear profile in a cross-section that includes the forward direction, the second output surface arranged to transmit, to the ambient environment in a backward angular range, light reflected by the reflective portion of the first output surface.

2. The illumination device of claim 1, wherein the reflective portion of the first output surface has a first end and a second end and is arranged to intersect the transmissive portion of the first output surface at the first end and the second output surface at the second end.

3. The illumination device of claim 2, wherein at least one of the transmissive portion or the reflective portion is flat.

4. The illumination device of claim 2, wherein at least one of the transmissive portion or the reflective portion is curved.

5. The illumination device of claim 2, wherein at least one of the transmissive portion or the reflective portion includes a step.

6. The illumination device of claim 2, wherein the transmissive portion intersects the reflective portion at the first end with common surface slope.

7. The illumination device of claim 1, wherein the transmissive portion of the first output surface has a first end and a second end and is arranged to intersect the reflective portion of the first output surface at the first end and the second output surface at the second end.

8. The illumination device of claim 7, wherein at least one of the transmissive portion or the reflective portion is flat.

9. The illumination device of claim 7, wherein at least one of the transmissive portion or the reflective portion is curved.

10. The illumination device of claim 7, wherein at least one of the transmissive portion or the reflective portion includes a step.

11. The illumination device of claim 7, wherein an intersection of the transmissive portion and the reflective portion at the first end forms a kink.

12. The illumination device of claim 1, wherein a relative arrangement of the first and second output surfaces causes light that propagates within the optical extractor to undergo multiple reflections between the first and second output surfaces such that light output into the ambient environment in the forward angular range and/or in the backward angular range has a more uniform intensity distribution or a more uniform color distribution than the guided light at the second end of the light guide.

13. The illumination device of claim 1, wherein the reflective portion of the first output surface is arranged and shaped to reflect via TIR all the guided light incident thereon in a first angular range having a direction with a component antiparallel to the forward direction and a first component orthogonal to the forward direction.

14. The illumination device of claim 13, wherein
the first output surface further includes a second transmissive portion arranged and shaped to transmit a second portion of the guided light to the ambient environment in another forward angular range and a second reflective portion arranged and shaped to reflect via TIR all the guided light incident on the second reflective portion,
the optical extractor further comprises a third output surface having a curvilinear profile in the cross-section that includes the forward direction, the third output surface arranged to transmit, to the ambient environment in another backward angular range, light reflected by the second reflective portion of the first output surface, and
the second reflective portion of the first output surface is arranged and shaped to reflect via TIR all the guided light incident thereof in a second angular range having a direction with a component antiparallel to the forward direction and antiparallel to the first component of the first direction.

15. The illumination device of claim 1, wherein the light guide and the optical extractor are bonded together or integrally formed.

16. The illumination device of claim 1 further comprising one or more optical couplers, wherein
the light provided by the LEEs is in an emission angular range,
the optical couplers are arranged to receive the light provided by the LEEs and redirect it to the first end of the light guide a collimated angular range, and
a numerical aperture of the light guide is such that the light received from the optical couplers in the collimated angular range can be guided by the light guide through TIR.

17. The illumination device of claim 1, wherein the light guide has two parallel side surfaces.

18. The illumination device of claim 1 extends orthogonally to the forward direction.

19. The illumination device of claim 18, wherein the LEEs are arranged orthogonally to the forward direction.

20. The illumination device of claim 1, wherein the LEEs are LEDs that emit white light.

* * * * *